United States Patent
Shiel et al.

(10) Patent No.: US 11,548,183 B2
(45) Date of Patent: Jan. 10, 2023

(54) TABLE SAW FENCE WITH ADJUSTMENT MECHANISM

(71) Applicant: Robert Bosch GmbH, Stuttgart (DE)

(72) Inventors: William Shiel, Bartlett, IL (US); Eric Laliberte, Naperville, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 333 days.

(21) Appl. No.: 16/722,347

(22) Filed: Dec. 20, 2019

(65) Prior Publication Data

US 2021/0187636 A1   Jun. 24, 2021

(51) Int. Cl.
  *B27B 27/02* (2006.01)
  *B27B 27/10* (2006.01)
  *B27B 27/08* (2006.01)
  *B23D 47/02* (2006.01)

(52) U.S. Cl.
  CPC .............. *B27B 27/02* (2013.01); *B27B 27/10* (2013.01); *B23D 47/025* (2013.01); *B27B 27/08* (2013.01); *Y10T 83/727* (2015.04); *Y10T 83/773* (2015.04)

(58) Field of Classification Search
  CPC ......... B27B 27/02; B27B 27/08; B27B 27/10; B23D 47/025; Y10T 83/6584; Y10T 83/6622; Y10T 83/727; Y10T 83/773
  USPC ........................................................ 83/438
  See application file for complete search history.

(56) References Cited

U.S. PATENT DOCUMENTS

| | | | | |
|---|---|---|---|---|
| 1,938,548 A * | 12/1933 | Tauts | ...................... | B23Q 1/74 83/438 |
| 1,963,688 A * | 6/1934 | Tautz | ...................... | B27B 27/02 83/438 |
| 2,325,082 A * | 7/1943 | Tautz | ...................... | B23Q 3/005 83/438 |
| 2,754,859 A * | 7/1956 | William | ................ | B23Q 3/005 83/438 |
| 2,764,190 A * | 9/1956 | Howard | ................. | B23Q 3/005 83/438 |
| 2,808,084 A * | 10/1957 | Eschenburg | ........... | B23Q 3/007 83/438 |
| 3,090,615 A * | 5/1963 | Maymorricyw | ....... | B28D 1/042 269/305 |
| 4,558,618 A * | 12/1985 | Bachmann | .............. | B27B 27/02 269/303 |
| 4,600,184 A * | 7/1986 | Ashworth | .............. | B23Q 3/005 269/303 |
| 5,181,446 A * | 1/1993 | Theising | ................. | B27B 27/02 83/438 |
| 5,293,802 A * | 3/1994 | Shiotani | .............. | B23D 47/025 269/318 |

(Continued)

Primary Examiner — Laura M Lee
(74) Attorney, Agent, or Firm — Kelly McGlashen

(57) ABSTRACT

A fence assembly configured to guide a workpiece with respect to a blade of a saw device includes a fence that is supported by rails for sliding movement relative to a work surface. Opposed ends of the fence are supported on the rails via rail engagement members. The fence assembly includes a fence angle adjustment mechanism associated with a housing of one of the rail engagement members. The fence angle adjustment mechanism includes biasing elements working in conjunction with an adjustment screw to adjust the position of the fence with respect to parallelism to the blade.

19 Claims, 16 Drawing Sheets

(56) References Cited

U.S. PATENT DOCUMENTS

| | | | | |
|---|---|---|---|---|
| 6,001,493 | A | * | 12/1999 | Rutledge ................ H01L 24/11 |
| | | | | 156/235 |
| 7,444,913 | B2 | * | 11/2008 | Shibata .................. B27B 27/02 |
| | | | | 144/253.1 |
| 8,789,450 | B2 | * | 7/2014 | Scherl .................... B27B 27/02 |
| | | | | 83/446 |
| 9,095,989 | B2 | * | 8/2015 | Chang .................... B27B 27/10 |
| 9,757,871 | B2 | | 9/2017 | Burke et al. |
| 11,192,272 | B2 | * | 12/2021 | Dutterer ................ B23D 47/02 |
| 2002/0050201 | A1 | | 5/2002 | Lane et al. |
| 2008/0072728 | A1 | * | 3/2008 | Oberheim .............. B27B 5/222 |
| | | | | 83/522.26 |

* cited by examiner

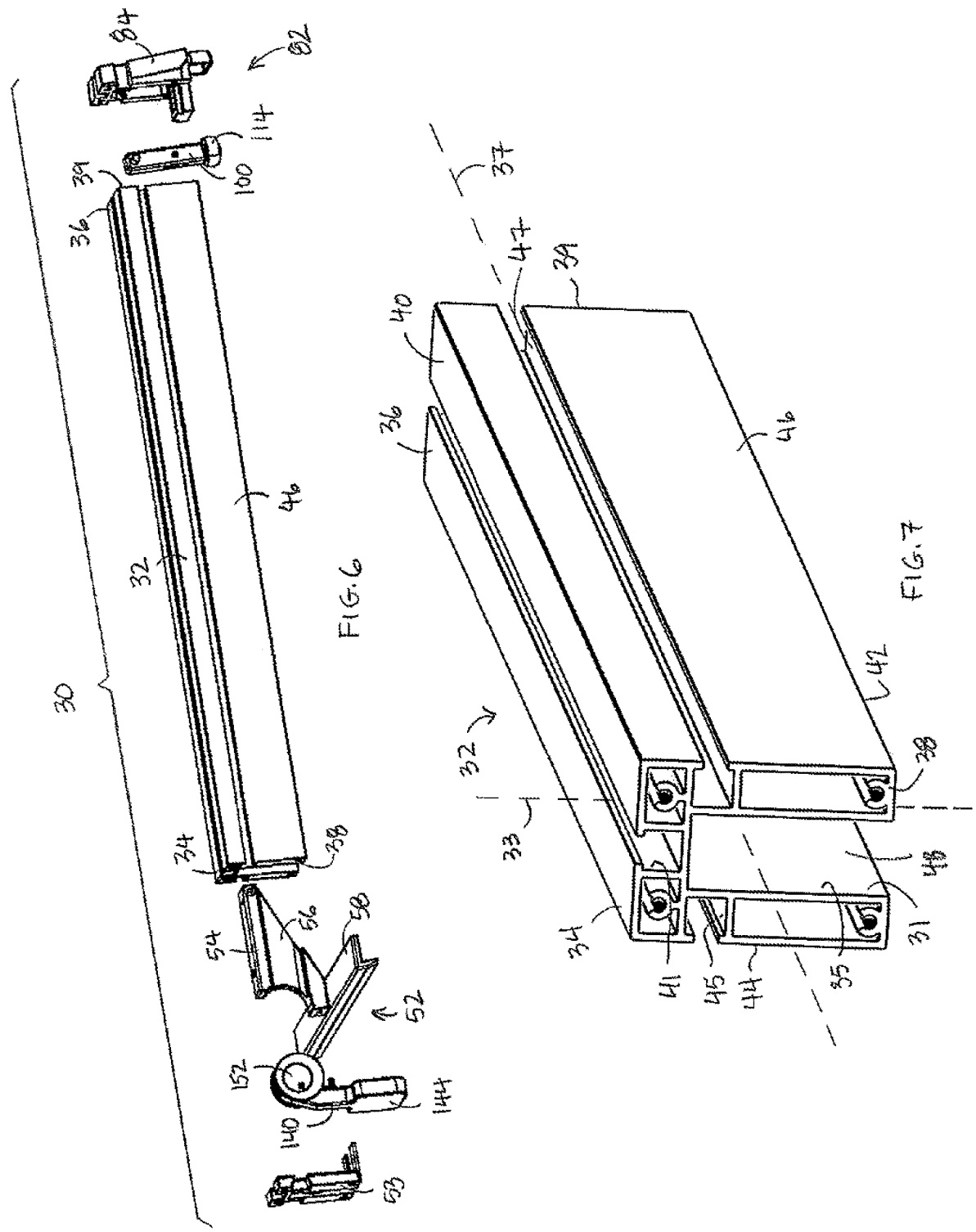

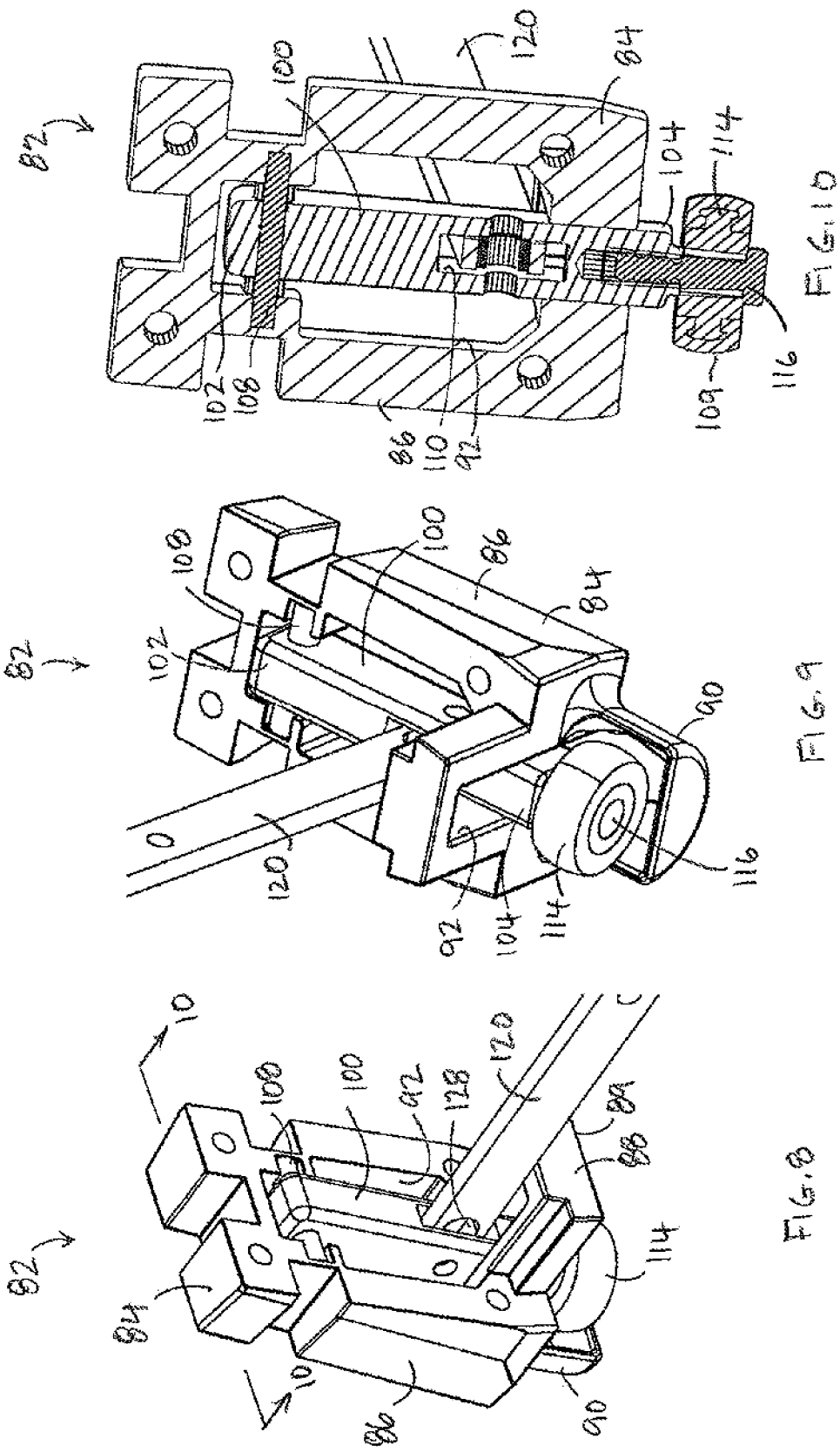

TABLE SAW FENCE WITH ADJUSTMENT MECHANISM

BACKGROUND

Table saws of various designs include a frame and an upward-facing work surface having an opening through which a blade extends. Table saws may include a movable fence that is supported on one or more rails disposed on opposed sides of the work surface. The fence provides a guide surface against which material to be cut is positioned. The fence can be positioned relative to the work surface by sliding the fence along the rails to a desired spacing from the blade, and securing the fence in a desired position using a locking mechanism. During a cutting operation, the material rests on the work surface while sliding along the fence as the material is cut by the saw blade. The fence enables the table saw to provide cuts that are accurate, straight and reproducible when the guide surface of the fence is arranged perpendicular to the work surface and is aligned in parallel to the blade. However, it can be difficult to adjust the position of the fence so that the guide surface of the fence has parallelism with respect to the blade. It is desirable to provide a fence with a fence alignment adjustment mechanism that can adjust the position of the fence so that the guide surface of the fence has parallelism with respect to the blade without losing reference to a prior position of the fence and without overcorrection. It is desirable that such a fence alignment adjustment mechanism provide an incremental or fine adjustment mechanism for accurate and precise adjustment of the fence relative to the saw blade.

SUMMARY

In some aspects, a fence assembly is configured to guide a workpiece with respect to a blade of a saw device, and the fence assembly is supported by a rail relative to a work surface of the saw device. The fence assembly includes a fence having a fence first end, and a fence second end that is opposed to the fence first end. The fence assembly includes a rail engagement member coupled to the fence first end and supported on the rail. The rail engagement member includes a first housing. The first housing has a body portion that is disposed inside the fence, and a flange portion that extends from an outer end of the body portion, is disposed outside the fence and is configured to engage the rail. The fence assembly includes a fence angle adjustment mechanism associated with the rail engagement member. The fence angle adjustment mechanism is configured to adjust the position of the fence with respect to parallelism to the blade. The fence angle adjustment mechanism includes an outer fastener that connects the fence to the body portion. The outer fastener provides an axis of rotation of the fence during adjustment of the fence with respect to parallelism to the blade. The fence angle adjustment mechanism includes an inner fastener that connects the fence to the body portion. The inner fastener is parallel to and spaced apart from the outer fastener. The fence angle adjustment mechanism includes an adjustment fastener that is connected to the body portion. The adjustment fastener is perpendicular to and spaced apart from the inner fastener and the outer fastener. Rotation of the adjustment fastener with respect to the body portion provides adjustment of an angular orientation of the fence about the axis of rotation. In addition, the fence angle adjustment mechanism includes an inner elastic member disposed between the fence and the body portion, the inner elastic member configured to bias the fence toward a head of the adjustment fastener.

In some embodiments, the fence angle adjustment mechanism includes an outer elastic member disposed between an inside surface of the fence and the outer end of the body portion.

In some embodiments, the inner elastic member is disposed between an inside surface of the fence and an inner end of the body portion, and the inner elastic member is disposed on an opposed side of the body portion relative to the outer elastic member.

In some embodiments, the outer fastener is disposed between a mid point of the body portion and the outer end of the body portion. The inner fastener serves as a stop, and is disposed between the mid point of the body portion and an inner end of the body portion. In addition, the adjustment fastener is disposed between the inner fastener and the inner end of the body portion.

In some embodiments, the adjustment fastener includes the head disposed outside the fence and a shank. The shank protrudes from the head, and extends through the fence and engages with the body portion. In addition, the inner elastic member is disposed between the body portion and the fence, and surrounds the shank of the adjustment fastener.

In some embodiments, the outer fastener extends through an outer opening in the fence and engages the body portion, and the outer opening receives the outer fastener in a pilot fit.

In some embodiments, the fence angle adjustment mechanism includes an outer elastic member disposed between an inside surface of the fence and the outer end of the body portion, and the outer elastic member biases the fence against the outer fastener.

In some embodiments, the inner fastener extends through an inner opening in the fence and engages the body portion, and the inner opening receives the inner fastener in a clearance fit.

In some embodiments, the fence includes a work surface-facing edge that faces the work surface of the saw device, and an opposed edge that is opposed to the work surface-facing edge. The outer fastener and the inner fastener extend through respective outer and inner openings in the opposed edge.

In some embodiments, the respective outer and inner openings in the fence opposed edge are aligned along a longitudinal axis of the fence, where the longitudinal axis of the fence extends between the fence first end and the fence second end.

In some embodiments, the fence angle adjustment mechanism comprises an outer elastic member disposed between an inside surface of the fence and the outer end of the body portion, and the outer elastic member biases the fence against the outer fastener.

In some embodiments, the fence assembly includes a cutting axis that corresponds to a cutting direction of the blade; and a guide axis that is transverse to the cutting axis and parallel to the rail. A longitudinal axis of the outer fastener is perpendicular to both the cutting axis and the guide axis, and the axis of rotation of the fence is coaxial with the longitudinal axis of the outer fastener.

In some embodiments, a longitudinal axis of the adjustment fastener extends in parallel to the guide axis.

In some embodiments, the fence includes a first side that is perpendicular to the work surface and faces the blade, and a second side that is opposed to the first side. At least one of the first side and the second side include a recess, and the head of the adjustment fastener is disposed in the recess.

In some embodiments, the fence includes a work surface-facing edge that faces the work surface of the saw device, and an opposed edge that is opposed to the work surface-facing edge, the opposed edge includes a recess, and heads of the inner fastener and the outer fastener are disposed in the recess.

In some aspects, a method is provided for adjusting the position of a guide fence of a saw device with respect to parallelism to a cutting blade of the saw device using a fence angle adjustment mechanism. The fence is supported by a rail for sliding movement relative to a work surface of the saw device, and opposed ends of the fence are supported on the rail via a rail engagement member. The fence angle adjustment mechanism is associated with a housing of the rail engagement member. The fence angle adjustment mechanism includes an outer fastener that connects the fence to the housing, and an inner fastener that connects the fence to the body housing. The inner fastener is parallel to and spaced apart from the outer fastener. The fence angle adjustment mechanism includes an adjustment fastener that connects the fence to the housing. The adjustment fastener is perpendicular to and spaced apart from the inner fastener and the outer fastener. Rotation of the adjustment fastener with respect to the housing provides adjustment of an angular orientation of the fence about an axis of rotation. In addition, the fence angle adjustment mechanism includes an inner elastic member disposed between the fence and the housing. The inner elastic member is configured to bias the fence toward a head of the adjustment fastener. The method includes the following method steps: Rotating both the inner fastener and the outer fastener so as to loosen both the inner fastener and the outer fastener; Rotating the adjustment fastener to move rear of fence, wherein rotation of the adjustment fastener in a first direction moves the fence towards the housing and rotation of the adjustment fastener in a second direction moves the fence away from the housing, where the second direction is opposed to the first direction; Following rotating the adjustment fastener, rotating the outer fastener so as to tighten the outer fastener; and Following rotating the outer fastener so as to tighten the outer fastener, rotating the inner fastener so as to tighten the inner fastener.

In some embodiments, the method includes the following method step performed at least prior to the step of rotating both the inner fastener and the outer fastener so as to loosen both the inner fastener and the outer fastener: Checking the alignment of the fence relative to the blade to determine if adjustment is necessary.

In some embodiments, the method includes the following method step performed following the step of rotating the inner fastener so as to tighten the inner fastener: Verifying that the fence is aligned with the blade.

In some aspects, a fence assembly is configured to guide a workpiece with respect to a blade of a saw device. The fence assembly is supported by one or more rails relative to a work surface of the saw device. The fence assembly includes a fence. The fence includes a fence first end, and a fence second end that is opposed to the fence first end. The fence assembly includes a first rail engagement member coupled to the fence first end and supported on a first one of the rails. The first rail engagement member includes a first housing. The first housing has a body portion that is disposed inside the fence, and a flange portion. The flange portion extends from an outer end of the body portion, is disposed outside the fence and is configured to engage the first one of the rails. The fence assembly includes a second rail engagement member coupled to the fence second end and supported on a second one of the rails. The second rail engagement member includes a second housing and a rail engagement device that is configured to engage the second one of the rails. In addition, the fence assembly includes a fence angle adjustment mechanism associated with the first rail engagement member. The fence angle adjustment mechanism is configured to adjust the position of the fence with respect to parallelism to the blade. The fence angle adjustment mechanism includes an outer fastener that connects the fence to the body portion. The outer fastener provides an axis of rotation of the fence during adjustment of the fence with respect to parallelism to the blade. The fence angle adjustment mechanism includes an inner fastener that connects the fence to the body portion. The inner fastener is parallel to and spaced apart from the outer fastener. The fence angle adjustment mechanism includes an adjustment fastener that is connected to the body portion. The adjustment fastener is perpendicular to and spaced apart from the inner fastener and the outer fastener. Rotation of the adjustment fastener with respect to the body portion provides adjustment of an angular orientation of the fence about the axis of rotation. In addition, an inner elastic member is disposed between the fence and the body portion, and the inner elastic member is configured to bias the fence toward a head of the adjustment fastener.

In some aspects, a table saw fence includes a mechanism that permits adjustment of the fence for parallelism with the blade of the table saw. The mechanism provides a biasing force to the fence working in conjunction with a positioning screw to fine tune the adjustment of the fence relative to the blade. Adjustment can be made to the blade fence angle without losing reference to a prior position. In addition, micro adjustment can be made without risk of overcorrection.

A method of using the fence angle adjustment mechanism is also provided. By using the method, the position of the fence can be finely adjusted so that the guide surface of the fence has parallelism with respect to the blade. As a result, the fence enables the table saw to provide cuts that are accurate, straight and reproducible.

BRIEF DESCRIPTION OF THE FIGURES

" In FIG. 5, solid lines are used to show the handle and pivot pin in a first position, and broken lines are used to show the handle and pivot pin in a second position.

FIG. 6 is an exploded perspective view of the fence assembly.

FIG. 7 is a perspective view of the fence isolated from the fence assembly.

FIG. 8 is a top perspective view of the tensioning mechanism of the fence assembly.

FIG. 9 is a bottom perspective view of the tensioning mechanism of the fence assembly.

FIG. 10 is a cross-sectional view of the tensioning mechanism of the fence assembly as seen along line 10-10 of FIG. 8.

DETAILED DESCRIPTION

Figure 1:
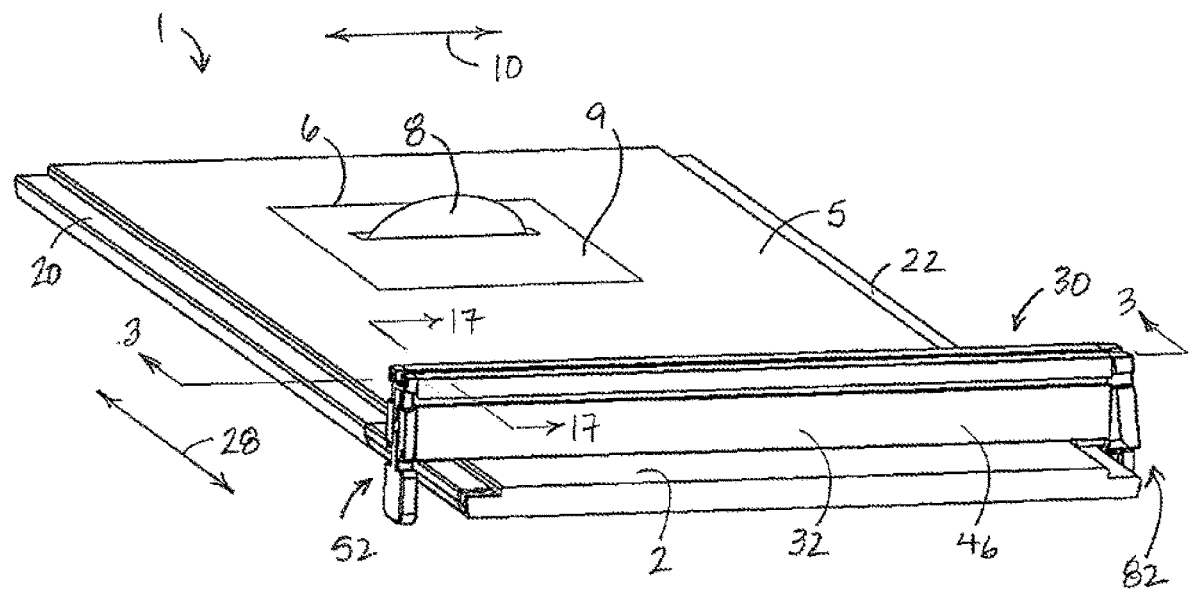
FIG. 1 is a perspective view of a portion of a saw device, showing a saw table top and fence assembly.
Figure 2:
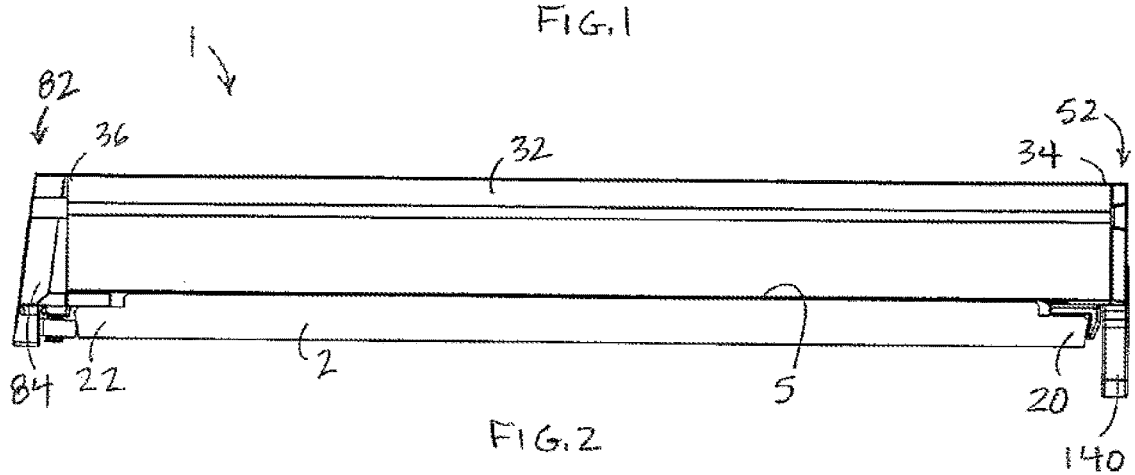
FIG. 2 is a side view of the table top and fence assembly.

Referring to FIGS. 1-7, a saw device 1 includes a table top 2, and a fence assembly 30 that is supported on the saw device 1 so that a fence 32 overlies the table top 2 and extends in parallel to a cutting blade 8 of the saw device 1. The saw device 1 illustrated in the figures is, for example, a table saw, although in other embodiments the saw device 1 may be configured as another type of cutting tool in which a fence assembly is used to position a workpiece (not shown) on a surface relative to the blade 8. The table top 2 is part of a table or cabinet structure (not shown) and defines a planar work surface 5 for supporting the workpiece. The table top 2 includes an opening 6. The blade 8 of the saw device 1, for example a circular saw blade, protrudes through the opening 6, and an insert 9 is disposed in the opening 6 between the blade and the work surface 5. A motor (not shown) is disposed inside cabinet of the saw device 1, and is configured to rotate the blade 8 within the opening 6. The table top 2 has a pair of rails 20, 22 configured to orient the fence assembly 30 relative to the blade when arranged on the table top 2. The fence assembly 30 includes a fence 32, a slide mechanism 52 located at a first end 34 of the fence 32, and a tensioning mechanism 82 located at a second end 36 of the fence 32. The fence assembly 30 includes a handle 140 that pivots between a locked position in which the fence assembly 30 is fixed relative to the table top 2, and a released position in which the fence assembly 30 is free to slide along the rails 20, 22 relative to the table top 2. The handle 140 is supported on the slide mechanism 52 via a cam 200. The fence assembly 30 includes a linkage in the form of a tension member 120 that extends between the handle 140 and the tensioning mechanism 82. The cam 200 is part of a fence tension adjustment mechanism 190 that is configured to enable adjustment of the tension force of the tension member 120. In addition, the fence assembly 30 includes a fence angle adjustment mechanism 300 that is configured to adjust the position of the fence 32 so that the guide surface 44 of the fence 32 has parallelism with respect to the blade 8. The fence assembly 30 including the fence angle adjustment mechanism 300 will be described in detail below. A method of using the fence angle adjustment mechanism 300 will also be described in detail below.

The pair of rails 20, 22 is configured to support the fence assembly 30 relative to the table top 2, and includes a first rail 20 and a second rail 22. The first rail 20 is located on a one edge (for example the front edge) of the table top 2, and the second rail 22 is located on an opposed edge (for example, the rear edge) of the table top 2. In some embodiments, the rails 20, 22 are formed integrally with the table top 2. In other embodiments, the rails 20, 22 are formed as separate parts, each of which is coupled to the table top 2 at an appropriate location. The rails 20, 22 are constructed of a rigid material such as metal or plastic. The first and second rails 20, 22 have the same shape, and the shape of the rails 20, 22 enables the fence assembly 30 to be easily attached to and removed therefrom. The shape of the rails 20, 22 also permits the fence assembly 30 to slide across the work surface 5 of the table top 2 for positioning by a user of the saw device 1.

Figure 3:
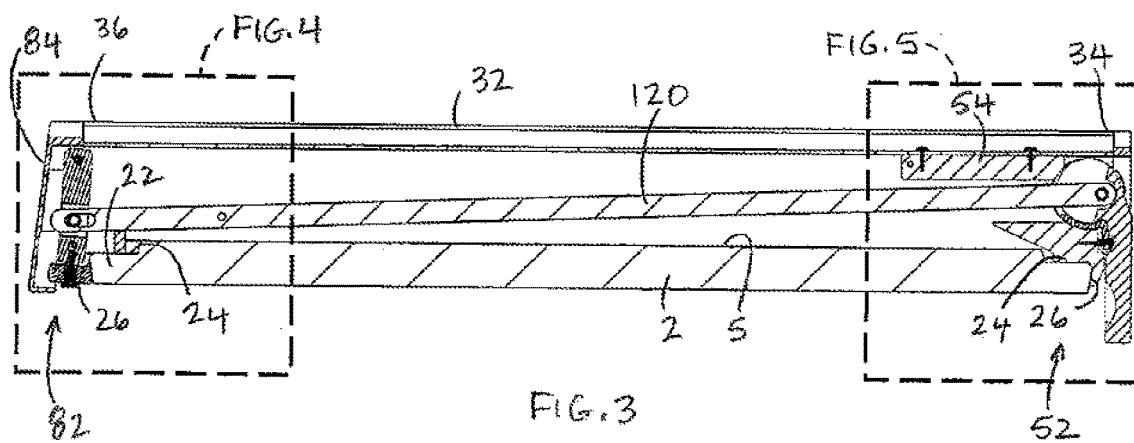
FIG. 3 is a cross-sectional view of the table top and fence assembly as seen along line 3-3 of FIG. 1.

The rails 20, 22 in the embodiment shown have a continuous outer surface such that the outer surface is formed without grooves or cavities that are typical of known rails. The outer surface includes a planar upper surface 24 for supporting a weight of the fence assembly 30 and a planar lateral surface 26 onto which the fence assembly 30 is clamped to attach the fence assembly 30 to the table top 2 (FIG. 3). The upper surface 24 is oriented substantially parallel to the work surface 5 of the table. The lateral surface 26 in some embodiments is oriented substantially normal to the cutting direction 10 although in other embodiments the lateral surface 26 has a negative angle. As used herein, a lateral surface with a negative angle means the lateral surface 26 has a planar orientation that imparts a downward force on a cooperating surface of the fence assembly 30 when the fence assembly 30 is arranged on the rails 20, 22 of the table top 2. The imparted downward force is configured to cause other surfaces of the fence assembly 30 to be urged downward against other surfaces of the table top 2 and the rails 20, 22. An internal region of the rails 20, 22 can be solid (shown), hollow or include any structure that improves the manufacturability, strength, and/or durability of the rails. The rails 20, 22 traverse the width of the table top 2 and define a guide axis 28 that is substantially perpendicular to the cutting direction 10 of the blade 8. The fence assembly 30 is positionable relative to the blade 8 along the guide axis 28.

The fence 32 (FIG. 7) is configured to guide the workpiece on the table top 2 and locate the slide mechanism 52 and the tensioning mechanism 82 relative to one another. The fence 32 is formed of a channel member or profile that in some embodiments defines an interior space for accommodating or positioning other elements of the fence assembly. For example, in some embodiments, the fence is an elongated hollow aluminum extrusion. The fence 32 includes a longitudinal axis 37 that extends between the fence first end 34 and the fence second end 36.

The fence includes side portions 44, 46 that extend between the fence first end 32 and the fence second end 36. The first side portion 44 faces the blade 8 and defines a substantially planar guiding surface for guiding the workpiece. When the fence assembly 30 is accurately positioned with respect to the blade 8, the side portion 44 provides a planar guiding surface that is substantially parallel with the cutting direction 10 of the blade to provide for precise cutting of the workpiece. In use, the workpiece rests on the table work surface 5 while abutting the guiding surface, for example side portion 44. The workpiece is cut by advancing the workpiece against the blade 8 including sliding the workpiece over the table work surface 5 and along the side portion 44.

The second side portion 46 faces away from the blade and is spaced apart from the first side portion 44. Elongated side grooves 45, 47 are provided in the first and second side portions 44, 46. In the illustrated embodiment, the side grooves 45, 47 extend between the fence first end 32 and the fence second end 36.

The fence includes an edge 42 that faces the work surface 5, and an opposed edge 40 that faces away from the work surface 5. In the orientation of the saw device 1 illustrated in FIG. 1, the work surface-facing edge 42 corresponds to a bottom edge of the fence 32, whereas the opposed edge 40 corresponds to the top edge of the fence 32. The fence edges 40, 42 join the first side portion 44 to the second side portion 46. Elongated edge grooves 35, 41 are provided in the bottom edge 42 and the top edge 40. In the illustrated embodiment, the edge grooves 35, 41 extend between the fence first end 32 and the fence second end 36, and the edge groove 35 provided in the bottom edge 42 has a larger cross sectional area than the edge groove 41 provided in the top edge 40. The edge groove 35 provided in the bottom edge 42 defines a hollow interior space 48 of the fence 32, and receives a portion of the slide mechanism 52 therein, as discussed below.

Referring to FIGS. 4 and 8-10, the tensioning mechanism 82 cooperates with the slide mechanism 52 and handle 140 to apply a tension force to the tension member 120, which results in the fence assembly 30 being clamped to the table top 2. The tensioning mechanism 82 includes a rear housing 84 that is fixed to the fence second end 36, and a bar 100 that is pivotally attached at a first end 102 thereof to the rear housing 84 via a bar pivot pin 108. In addition, the tensioning mechanism includes a wheel 114 that is rotatably secured to a second end 104 of the bar 100, where the second end 104 is opposed to the bar first end 102.

The bar 100 is a rigid structure having a rectangular cross section, and also includes a rod opening 110 that receives the tension member 120. The rod opening 110 is disposed generally midway between the bar first and second ends 102, 104. The tension member 120 is coupled to the bar 100 via a pivot pin 109 that extends through the bar 100 at a location corresponding to the rod opening 110.

Figure 4:
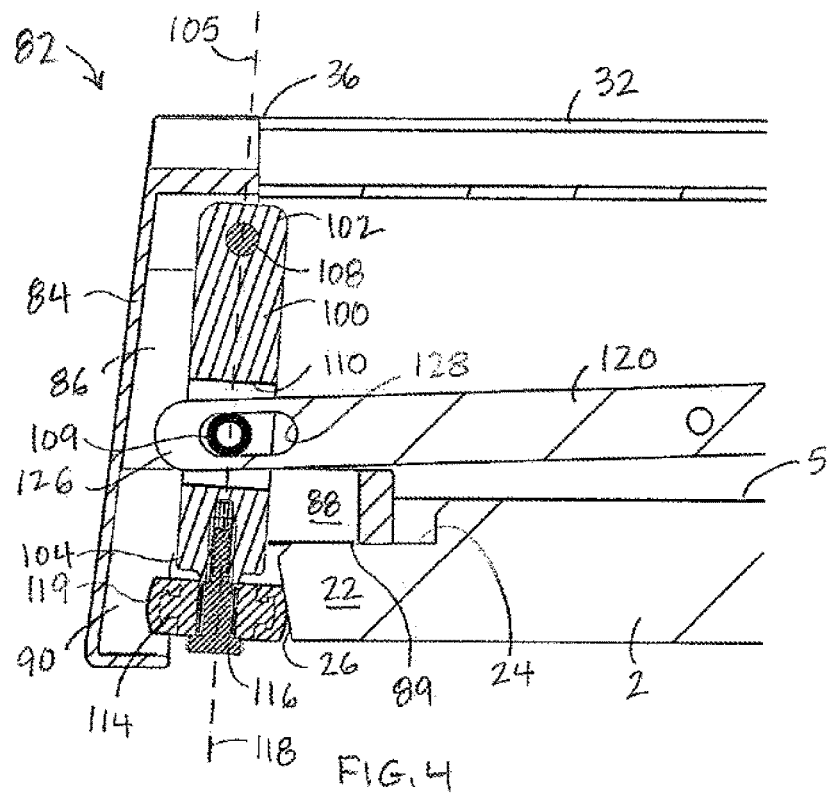
FIG. 4 is an enlarged view of the portion of FIG. 3 enclosed by broken lines and labeled "FIG. 4."

The wheel 114 is secured to the bar second end 104 so as to rotate about a wheel rotational axis 118 provided by a fastener 116 threaded into the bar 100. The wheel rotational axis 118 is parallel to a longitudinal axis 105 of the bar 100, where the bar longitudinal axis 105 extends between the bar first and second ends 102, 104. In this configuration, the wheel 114 is oriented for rolling contact with the lateral surface 26 of the rail 22 when the fence assembly 30 is moved along the guide axis 28. As illustrated in FIG. 4, the wheel 114 has a spherical profile 119 when viewed in a plane passing through and aligned with the wheel rotation axis 118. The spherical profile 119 allows freedom in the angular orientation of the wheel rotation axis 118 relative to the contact angle of rails 20, 22 so as to achieve linear rolling during movement of the fence assembly 30 along the guide axis 28.

The rear housing 84 is configured to cap the rear end face 39 of the fence 32. The rear housing 84 includes a cap portion 86 that closes the rear end face 39 of the fence 32, and a guide block portion 88 that protrudes from the cap portion 86 toward the table top 2 and is configured to be supported on, and slide relative to, the upper surface 24 of the rear rail 22. In addition, the rear housing 84 includes a housing stop portion 90 that depends from the cap portion 86. The housing stop portion 90 faces, and is spaced apart from, the rear rail lateral surface 26. In addition, the wheel 114 is disposed between the housing stop portion 90 and the rear lateral surface 26. Although there is sufficient space between the wheel 114 and the housing stop portion 90 for the wheel 114 to rotate freely about the wheel rotational axis 118, the housing stop portion 90 limits the extent of movement of the wheel 114 away from the rear lateral surface 26. The rear housing 84 includes a central through opening 92 that is defined within both the cap portion 86 and the guide block portion 88. The central through opening 92 is shaped and dimensioned to permit the bar 100 to pivot through an arc length defined between the rear rail lateral surface 26 and the housing stop portion 90.

The guide block portion 88 of the rear housing 84 is located proximate to the fence second end 36 on a lower portion of the fence 32. The guide block portion 88 protrudes inwardly from the cap portion 86, and has a planar lower surface 89 that is oriented substantially parallel to the upper surface 24 of the rail 22. In the illustrated embodiment, the guide block portion 88 is configured to support a weight of the fence assembly 30 on the rail 22 and provide a low resistance to motion when the fence assembly 30 is moved along the guide axis 28. In other embodiments, a lower surface of the fence 32 may support the weight of the fence assembly 30 across the table top 2 and provides a low resistance to motion when the fence assembly 30 is moved along the guide axis 28.

Referring to FIGS. 5 and 11-16, the slide mechanism 52 includes a front housing 54 that is disposed at the fence first end 34, and a cap 51 that closes the front end face 38 of the fence 32. The cap 51 includes an elongated slot 53 that receives, and permits rotational movement of the handle 140 relative to the cap 51 and the slide mechanism 52.

Figure 16:
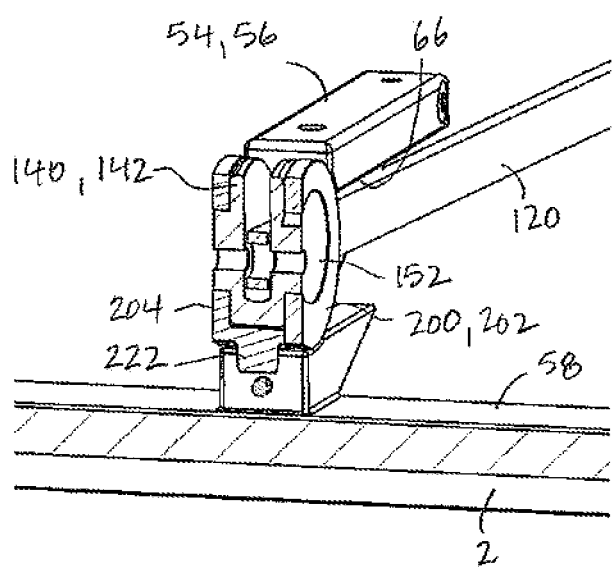
FIG. 16 is a cross-sectional view of the slide assembly as seen along line 16-16 of FIG. 11.
Figure 17:
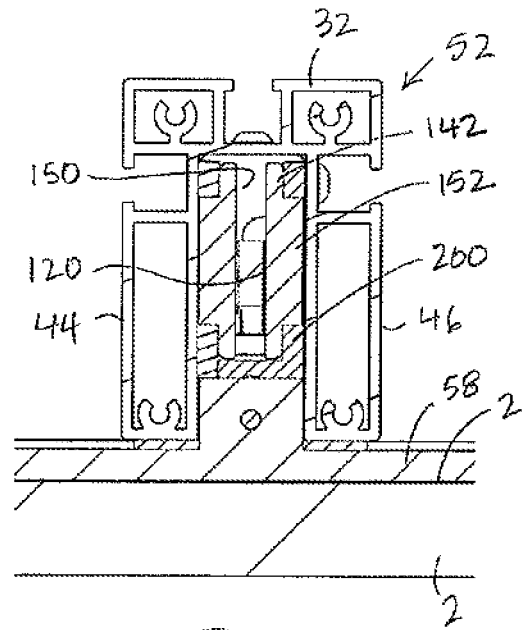
FIG. 17 is a cross-sectional view of the fence assembly as seen along line 17-17 of FIG. 1.
Figure 18:
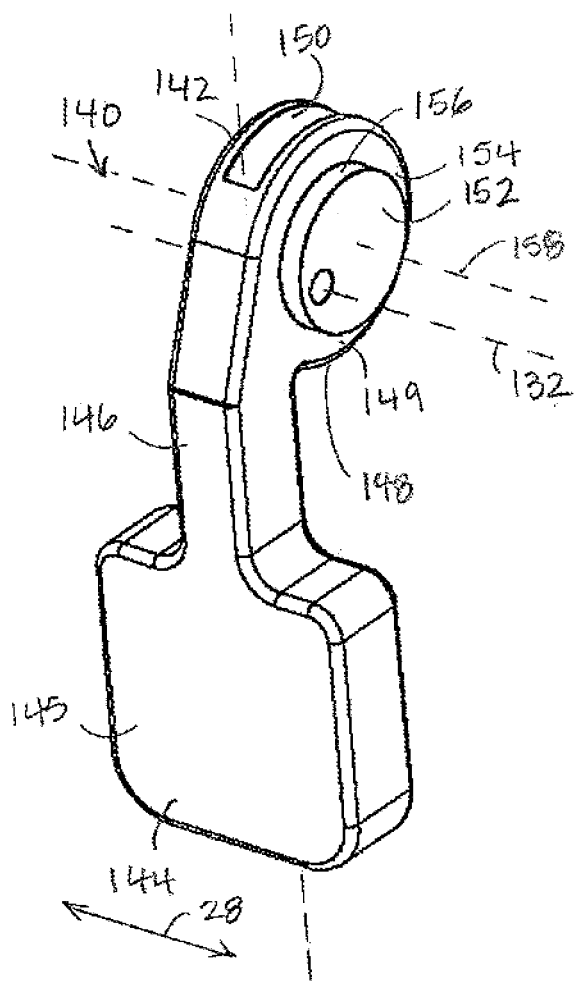
FIG. 18 is front perspective view of the handle.
Figure 19:
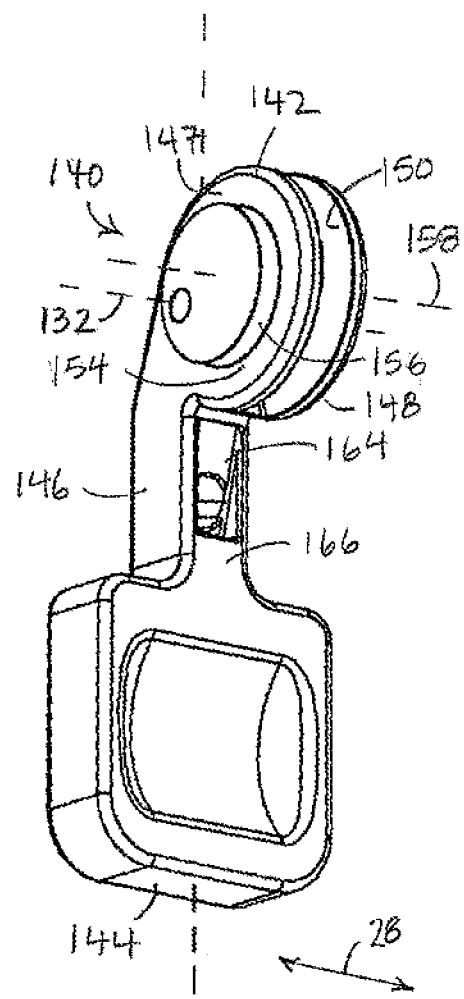
FIG. 19 is a rear perspective view of the handle.
Figure 20:
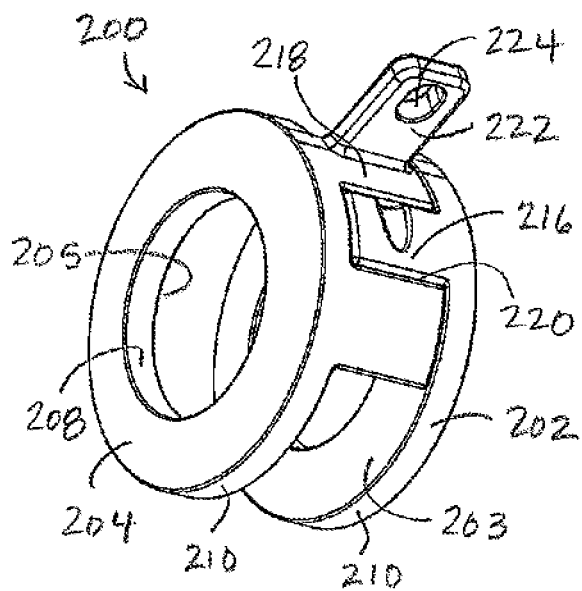
FIG. 20 is first perspective view of the cam.
Figure 21:
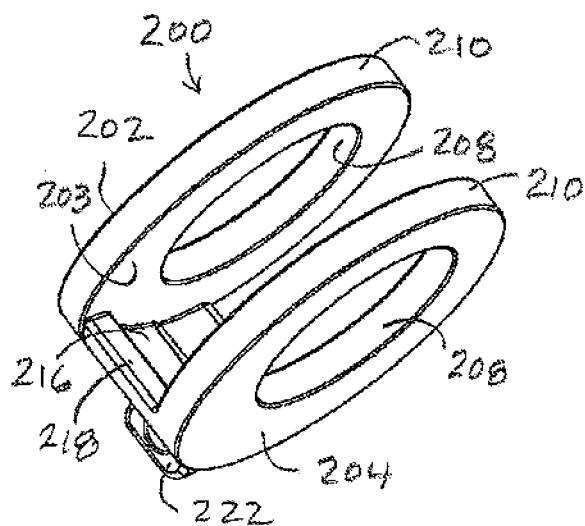
FIG. 21 is a second perspective view of the cam.
Figure 22:
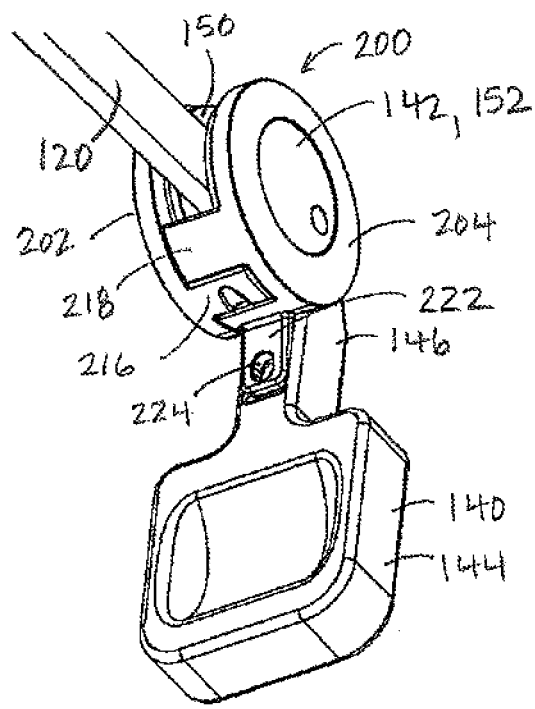
FIG. 22 is rear perspective view of the cam assembled on the handle.
Figure 23:
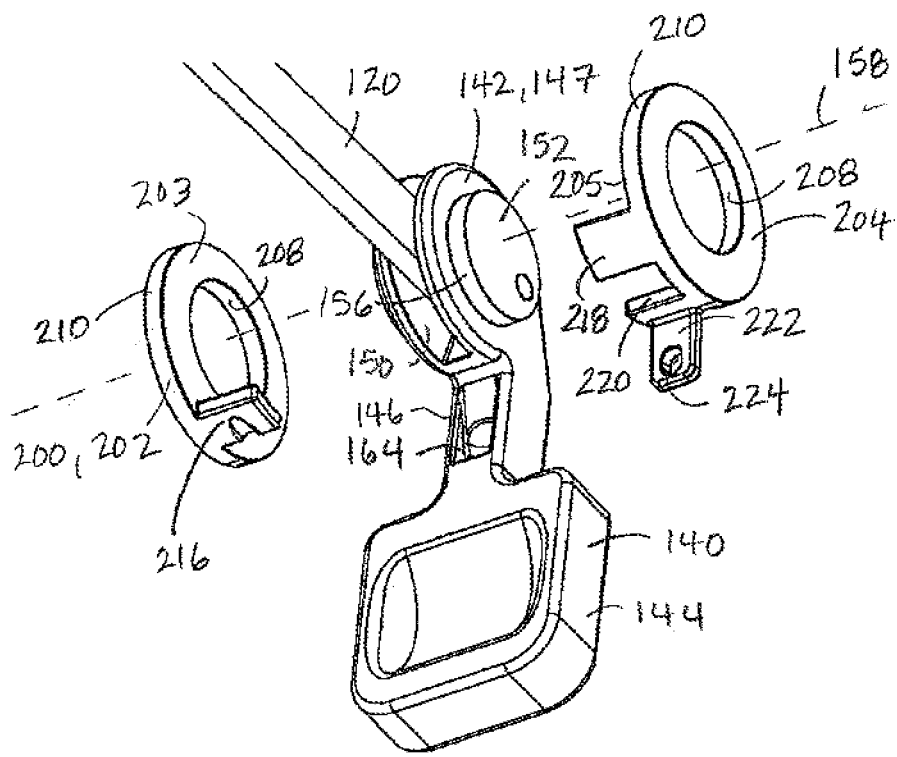
FIG. 23 is an exploded rear perspective view of cam assembled on the handle.

The front housing 54 is a rigid structure that has a T-shaped profile when viewed facing the table top 2. The front housing 54 includes a body portion 56 and a flange portion 58. The body portion 56 is elongated in a direction parallel to the cutting direction 10, and is disposed in the hollow interior 48 the fence 32. In particular, the body portion 56 is shaped and dimensioned to be received in the fence hollow interior 48 in a clearance fit, and is coupled to the first end 34 of the fence 32 using fasteners 302, 312. In addition, a side surface of the body portion 56 includes a groove 66 that extends in a direction parallel to cutting direction 10 and opens at each end 67, 68 of the body portion 56. The groove 66 provides a passageway that receives the tension member 120 (FIG. 16). The end 68 of the body portion 56 closest to the fence first end 34 and the front rail 20, referred to hereafter as the "outer end 68," includes a circular cutout 64 that rotatably supports a fence tension adjustment mechanism 190, as discussed further below. The end 67 of the body portion 56 furthest from the fence first end 34 and the front rail 20, is referred to hereafter as the "inner end 67."

The flange portion 58 is disposed the outer end 68 of the body portion 56. The flange portion 58 extends integrally from a table top-facing surface of the body portion 56, and extends bi-laterally from the body portion 56 along the guide axis 28. The flange portion 58 includes rail-facing surfaces 69, 70 that are shaped and dimensioned to confront and engage with the upper surface 24 and the lateral surface 26 of the first rail 20. For example, the flange portion 58 has a planar lower surface 69 and a planar lateral surface 70 that adjoins the lower surface 69. The lower surface 69 of the flange portion 58 is oriented substantially parallel to the upper surface 24 of the rails 20, 22. The orientation of the lateral surface 70 of the flange portion 58 corresponds substantially to the orientation of the lateral surface 26 of the rails 20, 22. In use, when the handle 140 is in a locked position, the body portion 56 and the flange portion 58 are fixed with respect to the fence 32 to establish alignment of the fence 32 relative to the blade via the slide mechanism 52.

The rail-facing surfaces 69, 70 each include a pair of slide contacts 60 that are spaced bilaterally from the fence 32 along the guide axis 28. In the illustrated embodiment, the slide contacts 60 are positioned proximate to ends of each of the rail-facing surfaces 69, 70. However, in other embodiments the slide contacts 60 may be positioned inward from the ends of each of the rail-facing surfaces 69, 70, or in other locations appropriate for facilitating a gliding motion of the flange portion 58 along the first rail 20.

In the illustrated embodiment, the slide contacts 60 are formed separately from the flange portion 58 and attached directly to the flange portion 58 by a fastener, adhesive, or the like. The slide contacts 60 can be formed from a polymer material such as ultra-high-molecular-weight polyethylene (UHMW) or Delrin S. In other embodiments, the slide contacts 60 are defined by the flange portion 58 such that the slide contacts are integrally formed by the material of the flange portion 58. The pairs of slide contacts 60 each establish two distinct contact points between the fence assembly 30 and a corresponding rail 20, 22 of the table top 2 to facilitate alignment of the fence assembly 30 relative to the blade. The slide mechanism 52 is positioned at a front of the table top 2 such that two pair of slide contacts 60 cooperate with the rail 20 located closest to the user of the saw device 1.

Figure 5:
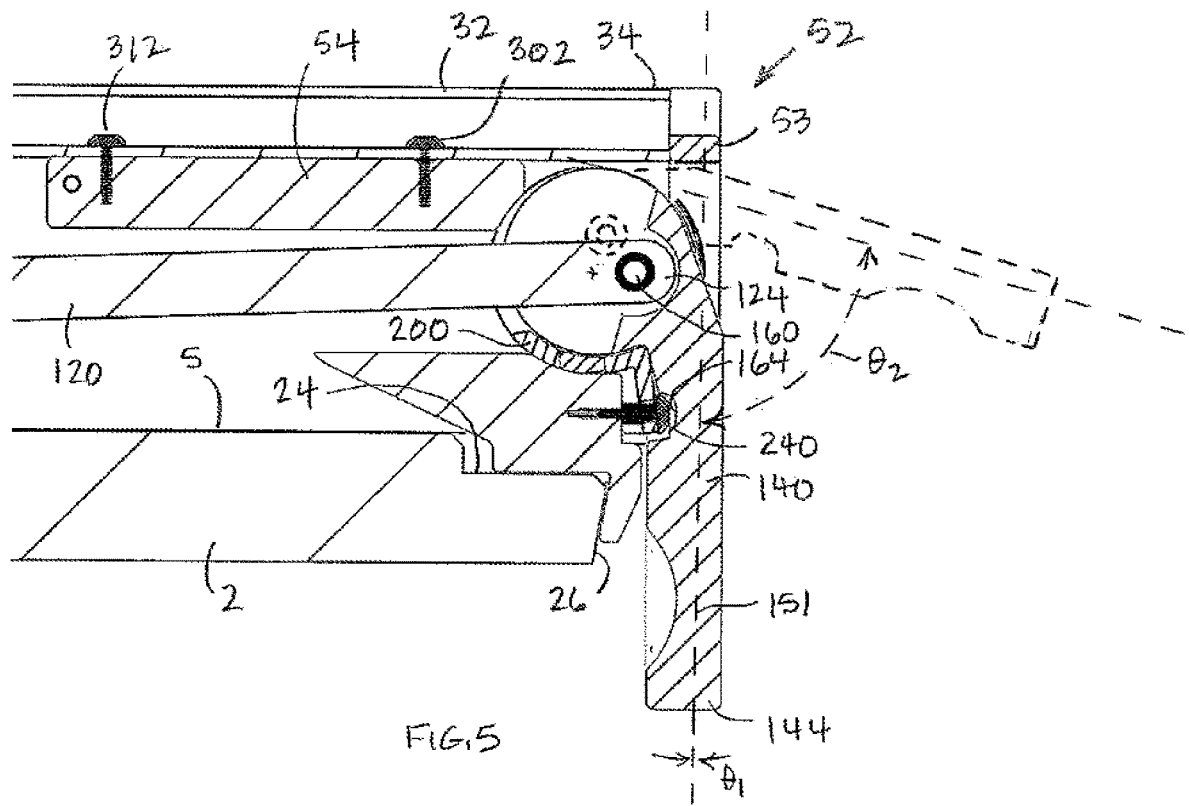
FIG. 5 is an enlarged view of the portion of FIG. 3 enclosed by broken lines and labeled "FIG. 5.
Figure 11:
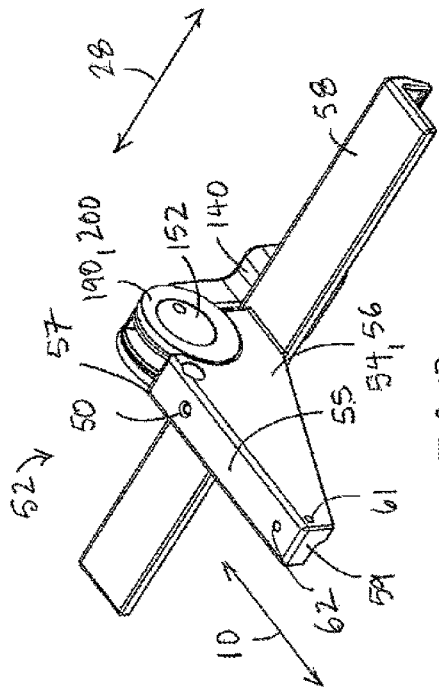
FIG. 11 is a front perspective view of the slide mechanism of the fence assembly.
Figure 13:
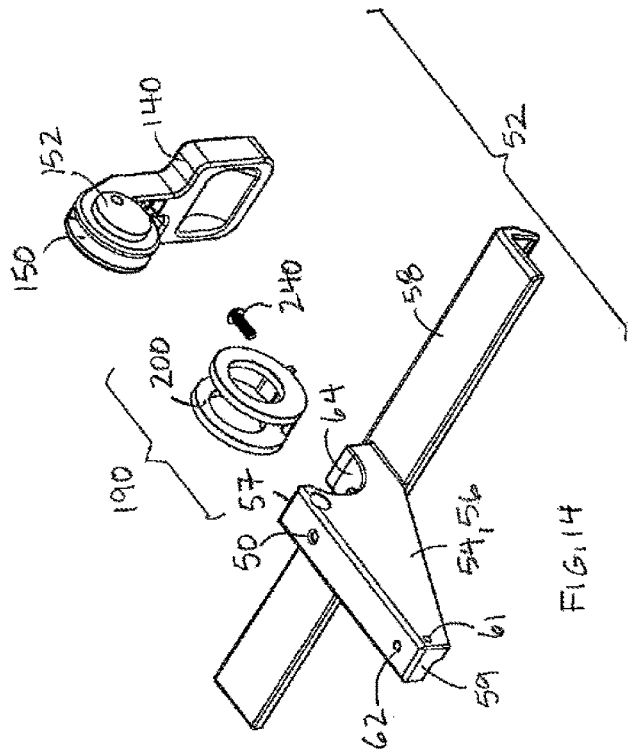
FIG. 13 is a rear perspective view of the slide mechanism of the fence assembly.
Figure 12:
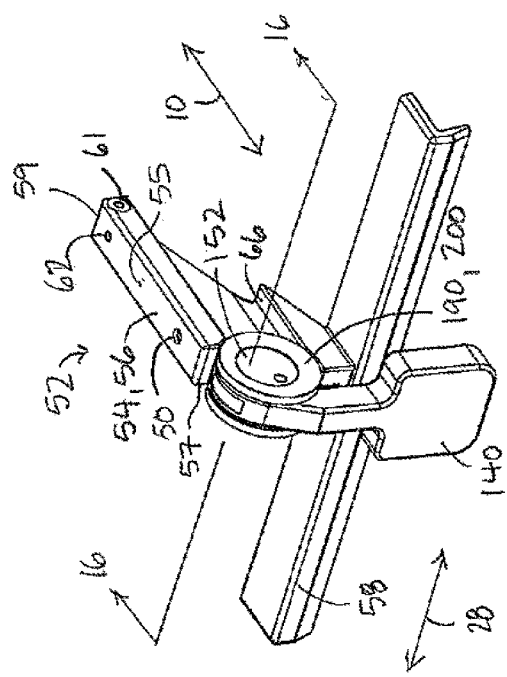
FIG. 12 is an exploded front perspective view of the slide mechanism of the fence assembly.
Figure 14:
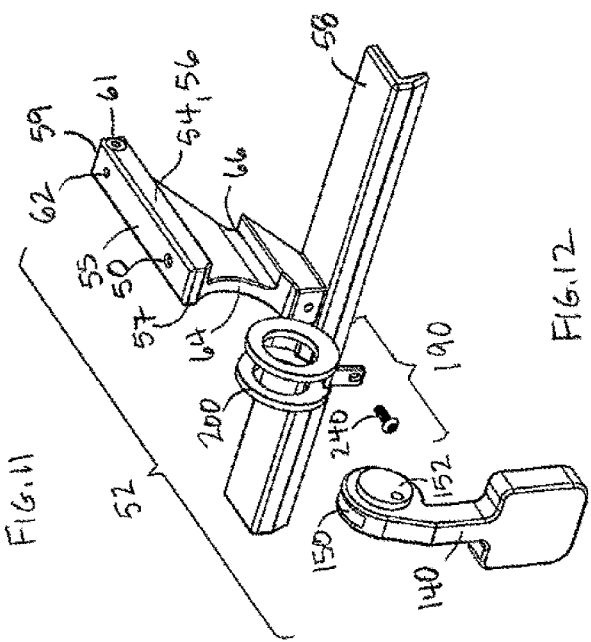
FIG. 14 is an exploded rear perspective view of the slide mechanism of the fence assembly.
Figure 15:
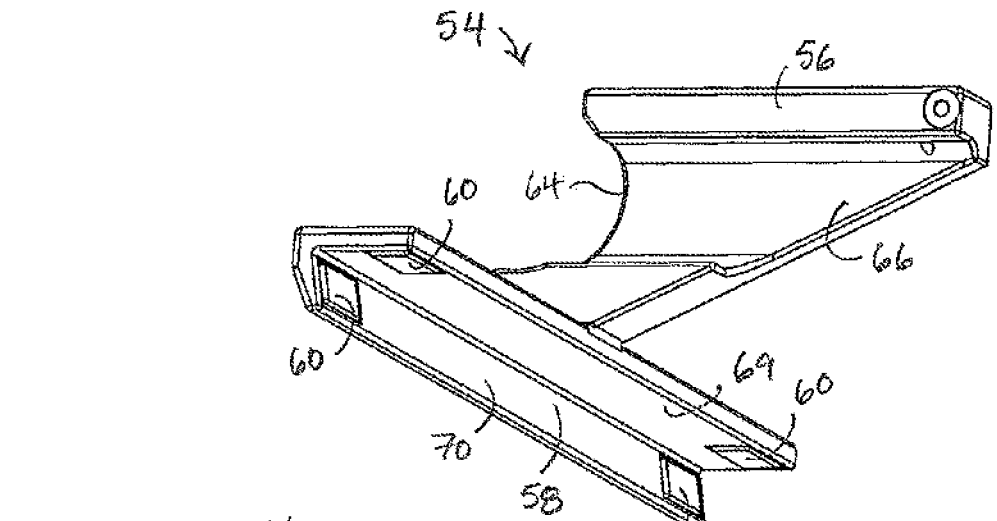
FIG. 15 is another rear perspective view of the slide mechanism of the fence assembly.

Referring to FIGS. 3-5, the tension member 120 is an elongated rigid rod that operatively couples the slide mechanism 52 to the tensioning mechanism 82. In the illustrated embodiment, the tension member 120 has a rectangular cross sectional shape, and is uniform in dimension along its length. The tension member 120 has a first end 124 that is connected the handle 140 via a pivot pin 160. The pivot pin 160 defines an axis of rotation of the tension member first end 124 relative to the handle 140. This axis of rotation is referred to hereafter as the tension member connection axis 132, as discussed further below. The tension member 120 has a second end 126 that is opposed to the first end 124. The tension member second end 126 includes an elongated through hole (e.g., a slot) 128 that receives the pivot pin 109, whereby the tension member second end 126 is pivotably coupled to the bar 100. In use, the tension member 120 is disposed within the fence 32 and transmits a tension force from the slide mechanism 52 to the tensioning mechanism 82 in certain positions of the handle 140, as discussed further below.

Referring to FIGS. 5, 18-19 and 22-23, the handle 140 is supported on the front housing 54 via the cam 200. The handle 140 includes a handle first end 142 that is coupled to the tension member 120, a handle second end 144 that is opposed to the first end 142, and a handle midportion 146 that is disposed between the handle first and second ends 142, 144. When the handle 140 is viewed in a direction perpendicular to the guide axis 28, the handle second end 144 is wide relative to the handle first end 142 and the handle midportion 146. The enlarged handle second end 144 is grasped by the user during operation of the handle 140, and has a rectangular shape including a planer outer surface 145 that is generally perpendicular to the fence side portions 44, 46. The handle 140 includes a longitudinal axis 151 that extends through the handle second end 144 and the handle midportion 146 and is parallel to the outer surface 145 of the handle second end 144.

When the handle 140 is viewed in a direction parallel to the guide axis 28, it can be seen that the handle first end 142 is offset toward the fence 32 relative to the handle midportion and second ends 146, 144. The handle first end 142 has a disk shape with planar side surfaces 147, 149 that are generally parallel to the fence side portions 44, 46. Thus, the handle first end 142 has a circular profile 148 when the handle 140 is viewed in a direction parallel to the guide axis 28. In addition, the handle first end 142 includes a channel 150 that opens along the circular profile 148. The channel 150 opens facing the fence 32 and extends in a direction perpendicular to the guide axis 28. The channel 150 is shaped and dimensioned to receive the tension member first end 124 and permit the tension member 120 to rotate freely relative to the handle 140 regardless of the position of the handle 140. To this end, the tension member 120 is secured to the handle first end 142 via the pivot pin 160 that bridges the channel 150.

The handle 140 includes a cylindrical axle 152 that extends integrally, and bi-laterally, from the side surfaces 147, 149 of the handle first end 142. The axle 152 is centered within the circular profile 148 defined by the handle first end 142 (e.g., the profile of the axle 152 is concentric with the profile of the handle first end 142). The axle 152 has an axle diameter d1 that is less than the diameter d2 of the handle first end 142, whereby a shoulder 154 is provided on the handle first end 142 that receives the cam 200. The axle 152 has an outer or circumferential surface 156 that is supported on inner bearing surfaces 208 of the cam 200 for rotation about a handle rotational axis 158, as discussed below. The handle rotational axis 158 is offset from the tension member connection axis 132 defined by the pivot pin 160. In the illustrated embodiment, the rotational axis 158 is closer to the fence than the tension member connection axis 132.

The handle 140 also includes a recess 164 that is formed on a fence-facing surface 166 of the handle midportion 146. The recess 164 is shaped and dimensioned to receive a catch plate 222 of the cam 200, as discussed below. In addition, a blind opening 168 is provided in the recess 164. The blind opening 168 is configured to engage with a fence tension adjustment screw 240, as discussed below.

The handle 140 is operatively coupled to the front housing 54 of the slide mechanism 52 via the cam 200 so that the handle 140 is rotatable about the handle rotational axis 158 relative to the front housing 54 between a first, locked position (shown in FIG. 5 using solid lines) and a second, released position (shown in FIG. 5 using broken lines).

In the first position, the handle longitudinal axis 151 is oriented at a first angle θ1 relative to the front housing 54. In the illustrated embodiment, when the handle 140 is at the first angle θ1 relative to the front housing 54, the handle longitudinal axis 151 is oriented substantially vertically, where the term "substantially vertically" refers to the first angle θ1 being within plus or minus (+/−) five degrees of vertical.

In the first position, the tension member connection axis 132 is located outward (e.g., further from the fence 32) relative to the handle rotational axis 158.

In the first position, a first tension force is applied by the tension member 120 to the bar 100 of the tensioning mechanism 82. The first tension force is sufficient to draw the wheel 114 against the rear rail 22. In addition, the tension member 120 subjects the slide mechanism 52 to a counter or reaction force in which the flange portion 58 is drawn against the front rail 20 and generates the perpendicular friction force, whereby the tensioning mechanism 82 generates a clamping force on the table top 2 between the wheel 114 and the pairs of slide contacts 60. The clamping force exerts a sufficient force to fix a position of the fence assembly 30 along the guide axis 28. In some embodiments, the clamping force is a "sufficient force" if it resists movement of the fence assembly 30 when a side load of at least 15 pounds is applied to the fence assembly 30 in the direction of the guide axis 28.

In the second position, the handle longitudinal axis 151 is oriented at a second angle θ2 relative to the front housing 54. When the handle 140 is at the second angle θ2 relative to the front housing 54, the handle longitudinal axis 151 is oriented in a range of 45 to 90 degrees relative to the vertical. In the illustrated embodiment, for example, the second angle t2 is about 70 degrees from the vertical.

As the handle 140 is rotated from the first position to the second position, the tension member connection axis 132 moves generally upward (e.g., away from the table top 2) and inward (e.g., toward the fence 32). In the illustrated embodiment, when the handle 140 is in the second position, the tension member connection axis 132 and the handle rotational axis 158 are located at about the same distance from the fence 32. As result of moving the tension member connection axis 132 closer to the fence 32, the tension force applied by the tension member 120 to the tensioning and slide mechanisms is reduced relative to the tension force applied in the first position. More specifically, in the second position, the tension force is sufficiently reduced to permit the fence assembly to easily move along the rails 20, 22 whereby the position of the fence assembly 30 relative to the table top 2 can be adjusted.

Referring to FIGS. 5, 12, 14 and 20-28, the fence assembly 30 includes the fence tension adjustment mechanism 190 configured to permit a user to finely adjust the fence locking force (e.g., the amount of tension force applied by the tension member 120 to the slide mechanism 52 and the tensioning mechanism 82) when the handle is in the first position. Advantageously, the fence tension adjustment mechanism 190 allows the user to compensate for cable stretch, wear in or excessive tension due, for example, to the stack up of tolerances during manufacturing. The fence tension adjustment mechanism 190 adjusts the effective length of the tension member 120, by either increasing or decreasing the effective length. This adjustability allows the user to achieve an optimal balance between the locked fence resistive force and the force required to be applied to the handle 140 by a user to change the handle position.

The fence tension adjustment mechanism 190 includes the cam 200 that supports the handle 140 for rotation relative to the front housing 54, and the fence tension adjustment screw 240 that secures the cam 200 to the front housing.

The cam 200 is an assembly of a first annular member 202 and a second annular member 204. The first annular member 202 supports the axle 152 on one side surface 147 of the handle first end 142, and the second annular member 204 supports the axle 152 on the other side surface 149 of the handle first end 142. The first annular member 202 is separable from the second annular member 204 to allow assembly with the axle 152, and in use the first annular member 202 is keyed to the second annular member 204 so as to rotate in concert with the second annular member 204.

Each of the first and second annular members 202, 204 includes an inner edge that serves as an inner bearing surface 208 that rotatably supports the axle outer surface 156. Each of the first and second annular members 202, 204 includes an outer edge that serves as an outer bearing surface 210 that is rotatably supported on the circular cut out 64 of the front housing 54. The outer bearing surface 210 has a circular profile, and is centered on a rotational axis 212 of the cam 200. The inner bearing surface 208 has a circular profile, is eccentric with respect to the outer bearing surface 210, and is concentric with the handle rotational axis 158.

The first annular member 202 includes a planar first handle-facing surface 203 that extends between the inner and outer bearing surfaces 208, 210 of the first annular member 202. When the cam 200 is assembled with the handle 140, the first handle-facing surface 203 abuts the first side surface 147 of the handle first end 142. In addition, the first annular member 202 includes a first protrusion 216 that protrudes from the first handle-facing surface 203 toward the second annular member 204. The first protrusion 216 has an outward-facing surface that is curved and flush with respect to a portion of the outer bearing surface 210 of the first annular member 202.

Likewise, the second annular member 204 includes a planar second handle-facing surface 205 that extends between the inner and outer bearing surfaces 208, 210 of the second annular member 204. When the cam 200 is assembled with the handle 140, the second handle-facing surface 205 abuts the second side surface 149 of the handle first end 142. In addition, the second annular member 204 includes a second protrusion 218 that protrudes from the second handle-facing surface 205 toward the first annular member 202. The second protrusion 218 has an outward-facing surface that is curved and flush with respect to a portion of the outer bearing surface 210 of the second annular member 204.

The second protrusion 218 includes a cut out 220 that opens toward the first annular member 202, and that is shaped and dimensioned to receive the first protrusion 216. When the cam 200 is assembled with the handle 140, the first protrusion 216 is disposed in the cut out 220, whereby the first annular member 202 is keyed to the second annular member 204. The second protrusion 218 also includes a depending leg that serves as a catch plate 222. The catch plate 222 extends radially outward (e.g., away from the handle first end 142) from the second protrusion 218. When the cam 200 is assembled with the handle 140, the catch plate 222 faces the handle mid portion 146, and is aligned with the recess 164. The catch plate 222 includes a through opening 224 that is configured to receive the fence tension adjustment screw 240 therethrough. More specifically, the through opening 224 has a sliding engagement with the fence tension adjustment screw 240 so that the catch plate 222 moves in concert with an axial position of the fence tension adjustment screw 240.

The cam 200 is formed of a low friction material to facilitate rotation of the cam 200 with respect to the front housing 54, and to facilitate rotation of the axle 152 relative to the cam inner bearing surfaces 208, 208. For example, in some embodiments, the cam 200 is formed of ultra high molecular weight (UHMW) polyethylene (PE).

The fence tension adjustment screw 240 includes a head 242 and a threaded shank 244 that extends from one end of the head 242. The threads of the shank 244 are shaped and dimensioned to engage with corresponding threads provided in the blind opening 168 that is located in the recess 164 of the handle midportion 146. At this location, the fence tension adjustment screw 240 is located below the cam axis of rotation 212.

The fence tension adjustment screw 240 is configured to adjust a rotational orientation of the cam 200 relative to the front housing 54. In particular, adjustment of the position of the fence tension adjustment screw 240 relative to the front housing 54 (for example, via rotation of the fence tension adjustment screw 240 relative to the opening 168) results in movement of the catch plate 222 relative to the front housing 54. In turn, the movement of the catch plate 222 results in a change in the rotational orientation of the cam 200 relative to the front housing 54. In this regard, the cam 200 is rotatable relative to the front housing 54 via adjustment of the fence tension adjustment screw 240. Because the handle axle 152 is supported eccentrically on the cam 200 inner bearing surface 208 relative to the cam rotational axis 212, the change in the rotational orientation of the cam 200 changes a position of the tension member connection axis 132 relative to the fence 32. In other words, the change in the rotational orientation of the cam 200 results in an increase or decrease in the effective length of the tension member 120.

Figure 27:
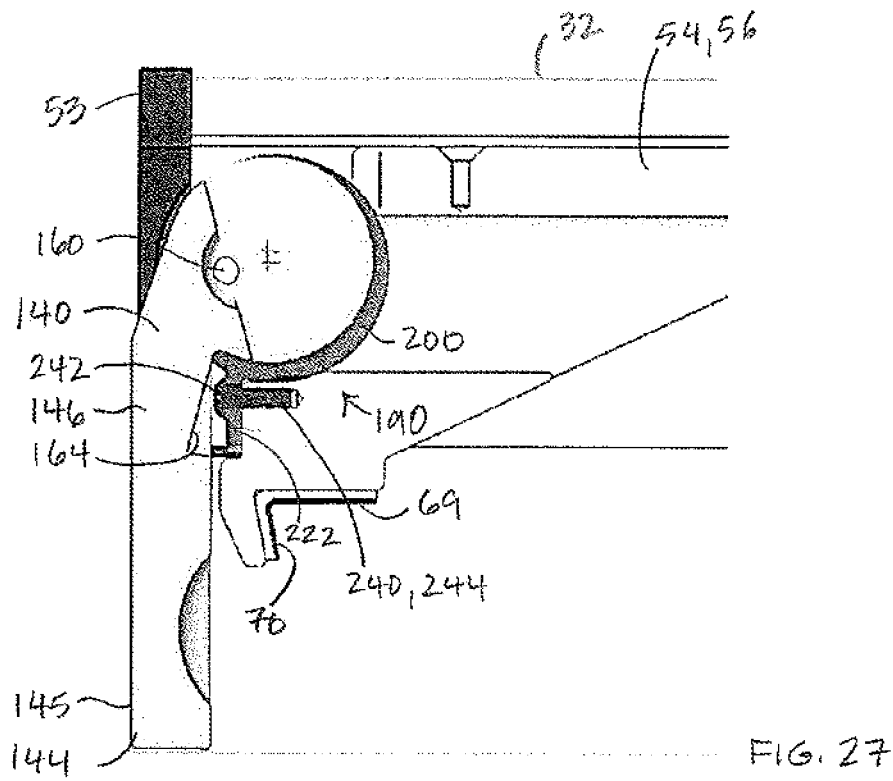
FIG. 27 is a side view of a portion of the fence assembly with the fence omitted, showing the fence tension adjustment mechanism in a first position.

Decreasing the effective length of the tension member 120 results in an increase in the tension force applied by the tension member 120. This is achieved by rotating the fence tension adjustment screw 240 into the threaded opening 168, which moves the catch plate 222 closer to the front housing 54 (FIG. 27). This increased tension force correlates to an increased locking force at the rear of the fence assembly 30 when the handle 140 is in the first, locked position. The increased tension force increases the effective resistance on the handle 140 and requires an increased input force from the user to operate the handle 140. This adjustment can be made to account for cable stretch, wear-in, etc. within the fence assembly 30.

Figure 24:
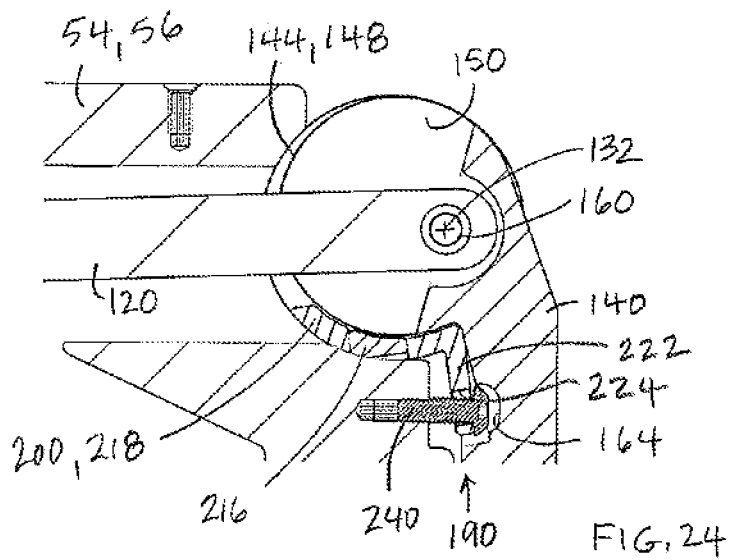
FIG. 24 is a cross sectional view of a portion of the fence assembly with the fence and slide mechanism cover omitted.
Figure 25:
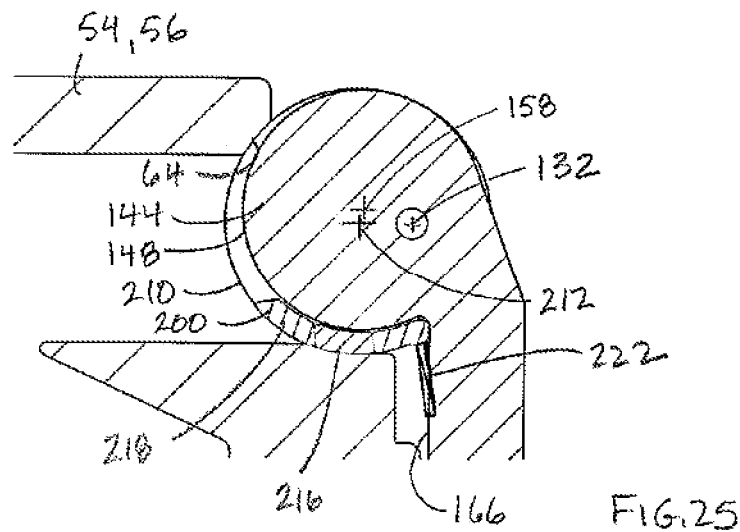
FIG. 25 is another cross sectional view of a portion of the fence assembly with the fence and slide mechanism cover omitted.
Figure 26:
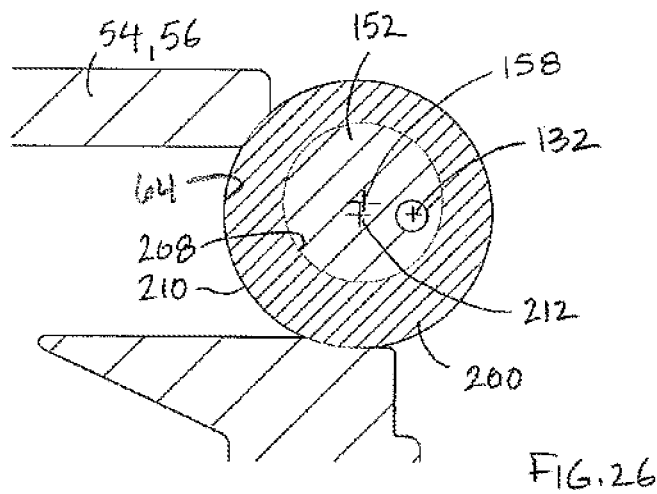
FIG. 26 is yet another cross sectional view of a portion of the fence assembly with the fence and slide mechanism cover omitted.
Figure 28:
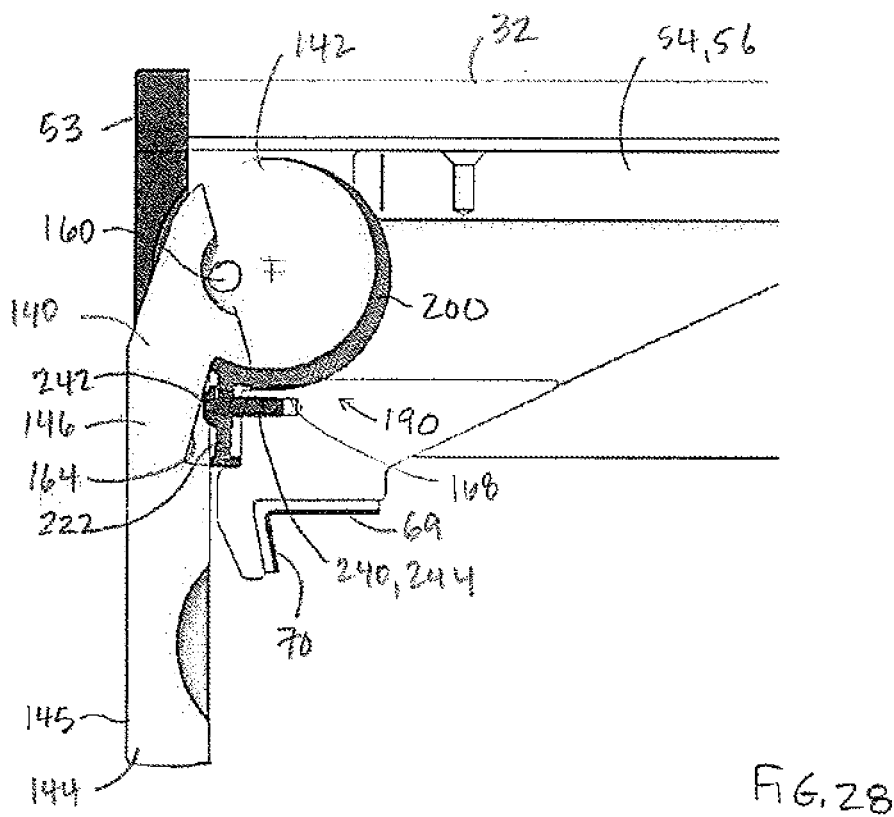
FIG. 28 is a side view of a portion of the fence assembly with the fence omitted, showing the fence tension adjustment mechanism in a second position.
Figure 29:
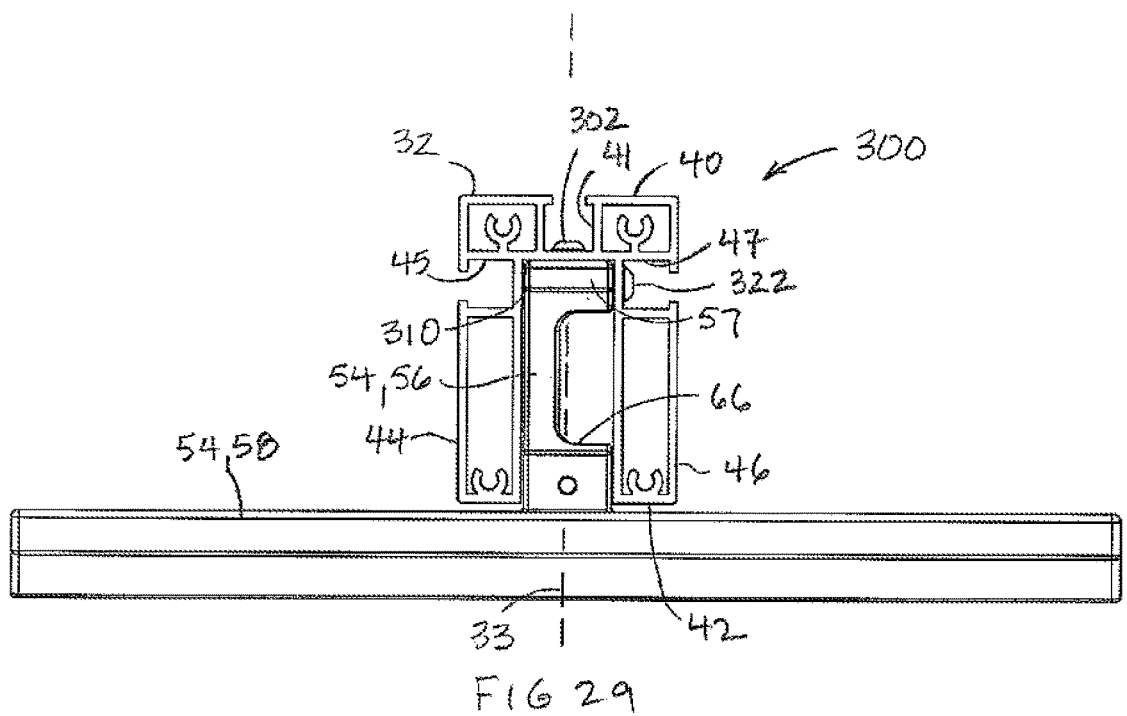
FIG. 29 is an end view of the fence assembly with the front cover, handle and tension adjustment mechanism omitted, illustrating the fence angle adjustment mechanism.
Figure 30:
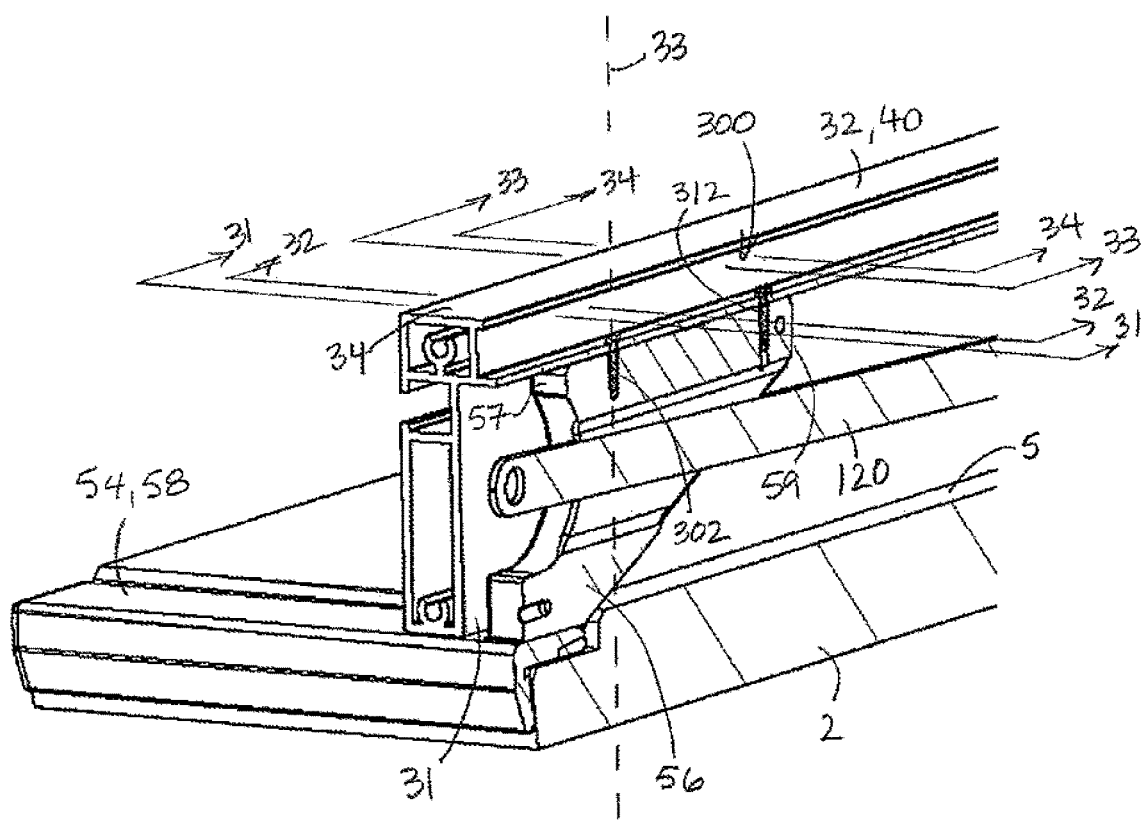
FIG. 30 is a perspective cross-sectional view of the fence assembly with the front cover, handle and tension adjustment mechanism omitted, illustrating the fence angle adjustment mechanism.
Figure 31:
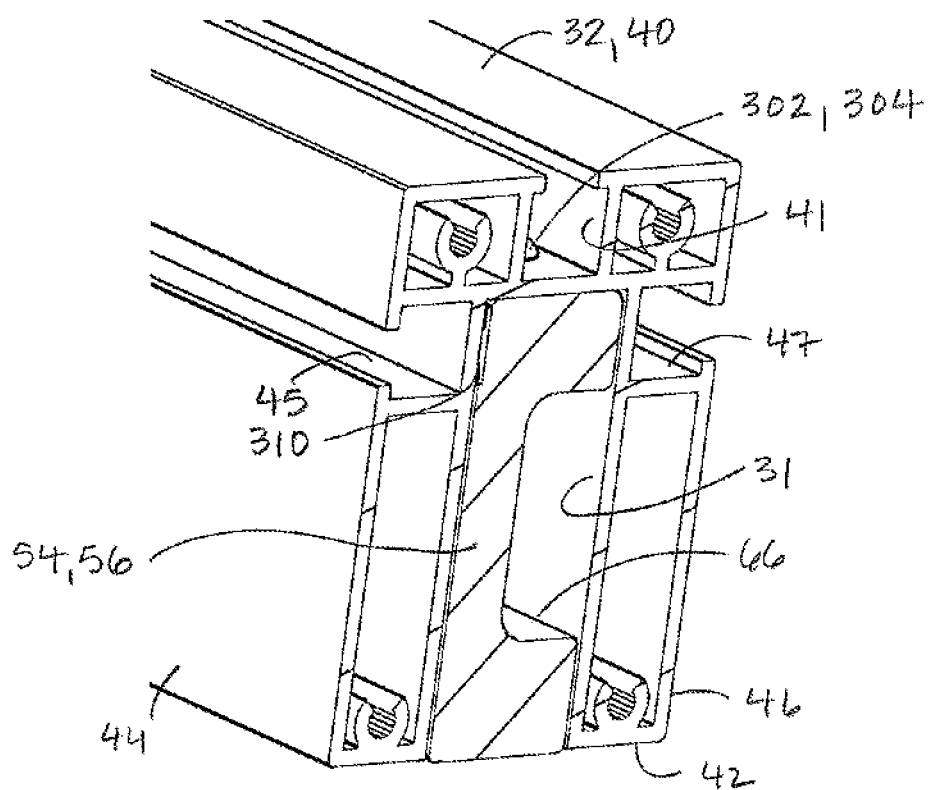
FIG. 31 is a perspective cross-sectional view of the fence assembly as seen along line 31-31 of FIG. 30 with the tension member omitted.
Figure 32:
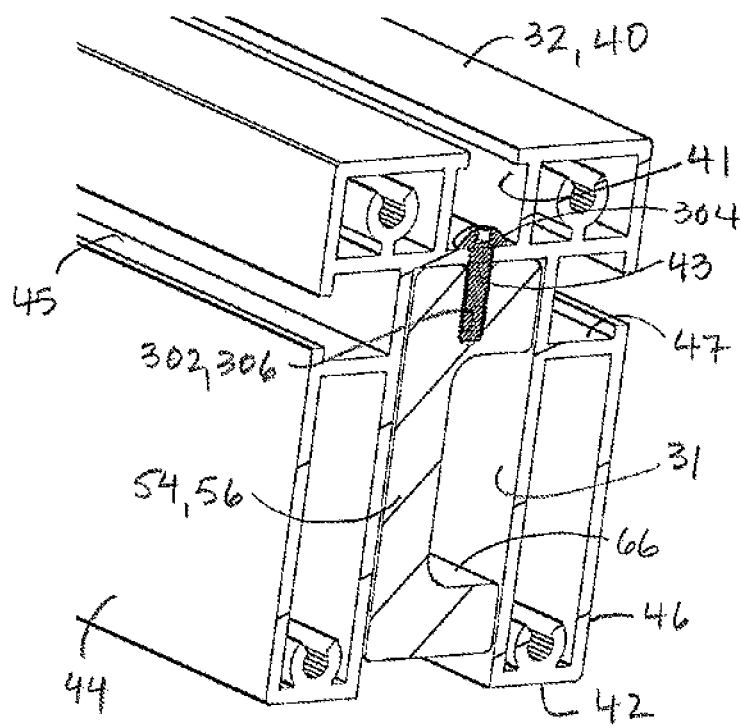
FIG. 32 is a perspective cross-sectional view of the fence assembly as seen along line 32-32 of FIG. 30 with the tension member omitted.
Figure 33:
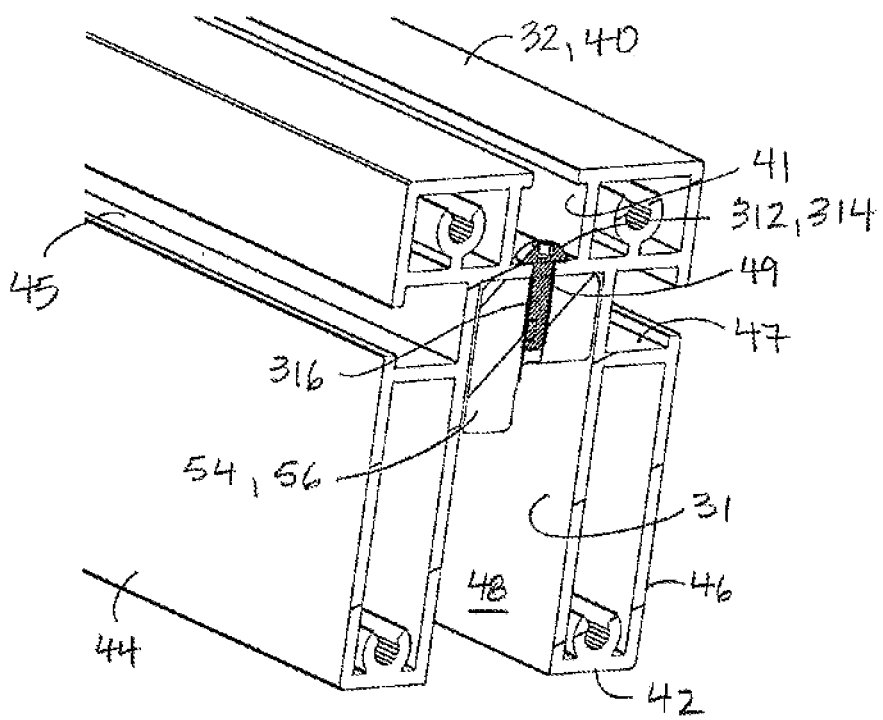
FIG. 33 is a perspective cross-sectional view of the fence assembly as seen along line 33-33 of FIG. 30 with the tension member omitted.
Figure 34:
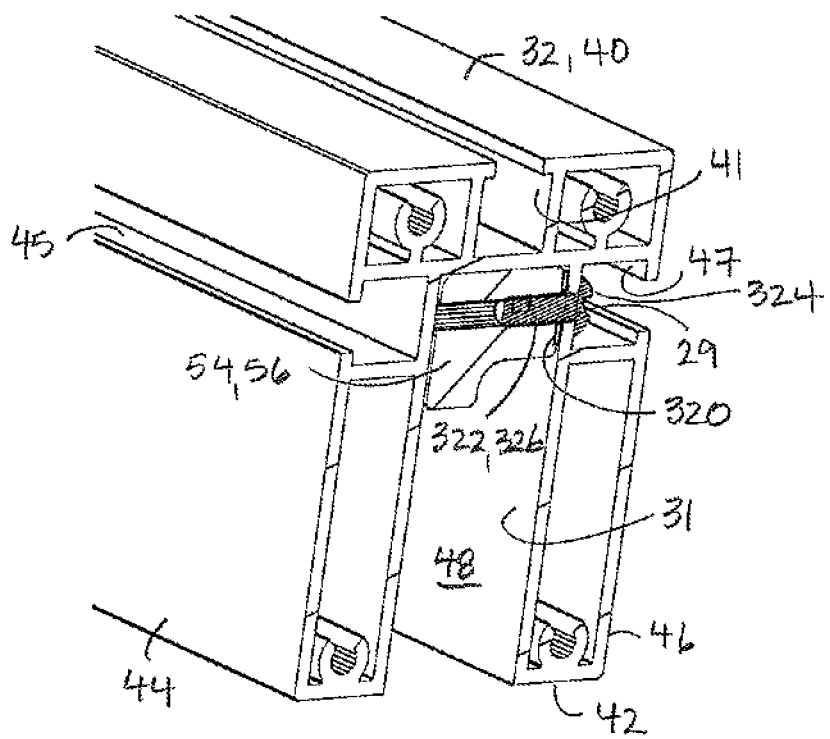
FIG. 34 is a perspective cross-sectional view of the fence assembly as seen along line 34-34 of FIG. 30 with the tension member omitted.
Figure 35:
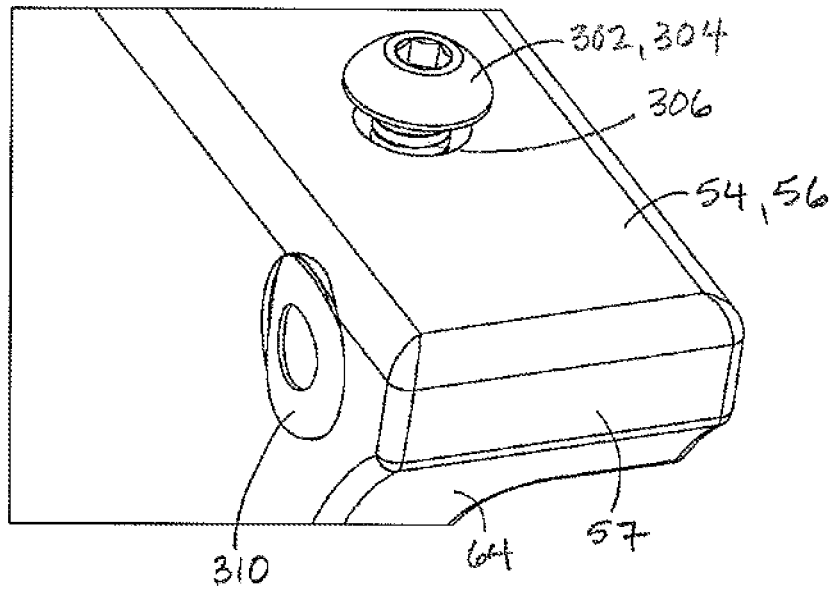
FIG. 35 is a perspective view of an outer end portion of the front housing showing a portion of the fence angle adjustment mechanism.
Figure 36:
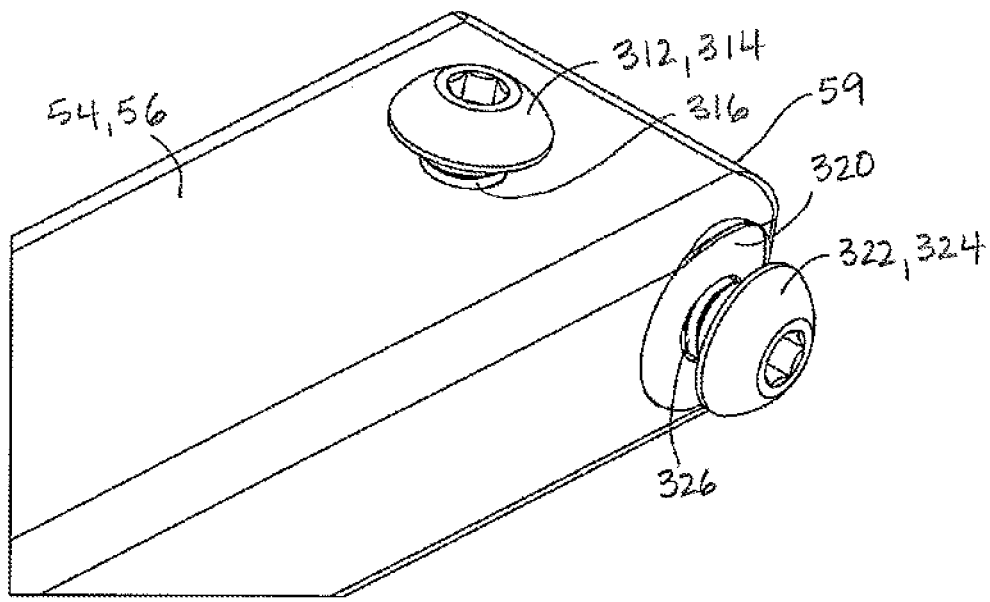
FIG. 36 is a perspective view of an inner end portion of the front housing showing a portion of the fence angle adjustment mechanism.

Increasing the effective length of the tension member 120 has the opposite effect. That is, increased effective tension length decreases the tension force applied by the tension member 120. This is achieved by rotating the fence tension adjustment screw 240 out of the threaded opening 168, which moves the catch plate 222 away from the front housing 54 (FIGS. 24 and 28). This results in a decreased locking force at the rear rail 22, but also results in a decreased input force from the user to operate the handle 140. This adjustment may be made, for example, if a tensioning adjustment is overdone and resulting force required to operate the handle 140 becomes unreasonable for the user.

The cam 200 is able to rotate in the fence assembly 30 in a range of at least 5 degrees and no more than 90 degrees. The tension member first end 124 is connected with rotational freedom to a position internal to the cam 200 but eccentric to the cam axis of rotation 212. The rotation of the cam 200, therefore, serves as a levering function to reposition the location of the tension member connection axis 132. The greater the distance from the tension member connection axis 132 to the cam axis of rotation 212, the greater the change in location for a given degree of adjustment angle. A greater degree of adjustment angle results in a greater change in position as well. The simple machine levering is achieved about the pivot point which is the cam axis of rotation 212, and the two balanced ends of the lever are the positions of the tension member connection axis 132 and the actuation point of the cam 200, e.g., the location of the fence tension adjustment screw 240. As the distance between the location of the fence tension adjustment screw 240 and the tension member connection axis 132 is increased, the force required for adjustment of tension is decreased. The location of tension member connection axis 132 is important as the eccentric tension force will induce a rotational moment on the adjustment member. The cam 200 is configured to support any moment induced by the tensile force.

Once the adjustment of the rotational orientation of the cam 200 relative to the front housing 54 has been made, the fence tension adjustment screw 240 serves to secure (e.g., fix) the cam 200 to the front housing 54 in the desired cam rotational orientation, and the handle 140 can be moved relative to the fixed cam 200 between the handle first position and the handle second position.

Since the fence tension adjustment screw 240 is disposed between the handle 140 and the front housing 54, the fence tension adjustment screw 240 is located behind the handle 140 when the fence assembly 30 is viewed by a user of the saw device 1. Placement of the fence tension adjustment screw 240 in this location prevents adjustment of the cam rotational orientation when the fence assembly 30 is in a locked state and the tension forces are higher. When the fence assembly 30 is in an unlocked state and the handle 140 is in the second position, the fence tension adjustment screw 240 is exposed permitting adjustment of the cam rotational orientation, and thus of the tension force of the tension member 120, as discussed below. In the unlocked state, the tension forces are much lower and the adjustment is easier.

This configuration allows for a fence tension adjustment mechanism 190 which does not have to function under higher loads and can therefore be more compact due to lower strength requirements.

Since the fence tension adjustment mechanism 190 including the cam 200 and fence tension adjustment screw 240 are disposed on the front housing 54, the fence tension adjustment mechanism 190 is easily accessible by a user standing at the front of the saw device 1. Moreover, the tension of the tension member 120 can be adjusted using the fence tension adjustment mechanism 190 without removing the fence assembly 30 from the table top 2.

Referring to FIGS. 29-37, the fence angle adjustment mechanism 300 is associated with the slide mechanism 52, and is configured to adjust the position of the fence 32 with respect to parallelism to the blade 8. In particular, the fence angle adjustment mechanism 300 is configured to change an angle of the fence longitudinal axis 37 with respect to the cutting direction 10 so that the fence 32 is parallel thereto. The fence angle adjustment mechanism 300 includes an outer fastener 302 and an inner fastener 312 that connect the fence 32 to the body portion 56, elastic members 310, 320 that exert biasing forces on the fence 32, and a fence angle adjustment fastener 322 that is configured to permit controlled and precise adjustment of the position of the fence 32 with respect to parallelism to the blade 8. The elements 302, 310, 312, 320, 322 of the fence angle adjustment mechanism 300 will now be described in detail.

The outer fastener 302 extends through an outer opening 43 in the top edge of the fence 32 and engages with a threaded, outer blind hole 50 in the body portion 56. In the illustrated embodiment, the outer fastener 302 is, for example, a screw having a head 304 and a threaded shank 306 that protrudes from the head 304. The outer opening 43 is provided in the top edge groove 41 so that the outer fastener head 304 is recessed relative to the surface of the fence top edge 40. The outer opening 43 is shaped and dimensioned to be a close piloting hole for the outer fastener shank 306. In other words, the outer opening 43 has a pilot fit with respect to the outer fastener shank 306, where the term "pilot fit" refers to having little play between the outer opening 43 and the outer fastener shank 306, so as to result in concentricity between the outer fastener shank 306 and the outer opening 43. The outer blind hole 50 is disposed adjacent to the body portion outer end 57. More specifically, the outer blind hole 50 is disposed between the body portion outer end 57 and a body portion midpoint 55 that is midway between the body portion outer end 57 and the body portion inner end 59.

The inner fastener 312 extends through an inner opening 49 in the top edge of the fence 32 and engages with a threaded, inner blind hole 62 in the body portion 56. In the illustrated embodiment, the inner fastener 312 is, for example, a screw having a head 314 and a threaded shank 316 that protrudes from the head 314. The inner opening 49 is provided in the top edge groove 41 so that the inner fastener head 314 is recessed relative to the surface of the fence top edge 40. The inner opening 49 is shaped and dimensioned to be a loose clearance hole for the inner fastener shank 316 (e.g., to have a generous clearance fit with respect to the inner fastener shank 316), as will be discussed further below. The inner opening 49 is aligned with the outer opening 43 along the fence longitudinal axis 37. The inner blind hole 62 is disposed adjacent to the body portion inner end 59. More specifically, the inner blind hole 62 is disposed between the body portion inner end 59 and the body portion midpoint 55. By this configuration, the inner fastener 312 is spaced apart from the outer fastener 302 and the inner fastener shank 316 is parallel to the outer fastener shank 306.

The outer elastic member 310 is for example, a Belleville washer, and is disposed between the body portion outer end 57 and the outer fastener 302. In addition, the outer elastic member 310 is disposed between an inside surface 31 of the fence 32 and the body portion 56. In particular, the outer elastic member 310 is disposed between the fence first side portion 44 and a side surface of the body portion 56, whereby the outer elastic member 310 exerts a force on the fence inside surface 21 in a direction parallel to the guide axis 28 and toward the blade 8. As a result, the outer opening 43 is biased against the outer fastener shank 306. Since the outer opening 43 is a close piloting hole and fence 32 is biased against the outer fastener shank 306, the outer fastener 302 defines a fence axis of rotation 33 that extends perpendicular to the cutting direction 10 and the guide axis 28.

The fence angle adjustment fastener 322 is configured to permit controlled and precise adjustment of the angular orientation of the fence 32 about the fence axis of rotation 33. In the illustrated embodiment, the fence angle adjustment fastener 322 is a screw that includes a head 324 disposed outside the fence 32 and a shank 326 that protrudes from the head 324. The shank 326 extends through a side opening 29 in the second side portion 46 of the fence 32, and engages with a threaded blind hole 61 in a side of the body portion 56. The blind hole 61 is disposed between the inner blind hole 62 and the body portion inner end 59. As a result, the fence angle adjustment fastener 322 is spaced apart from the inner fastener 302 and the outer fastener 306 so as to be closer to the body portion inner end 59. The side opening 29 is provided in the side groove 47 in the fence second side portion 46 so that the fastener head 324 is recessed relative to the surface of the fence second side portion 46. The shank 326 of the fence angle adjustment fastener 322 is perpendicular to the cutting direction 10 and parallel to the work surface 5 and guide axis 28. This can be compared to the shank 306 of the outer fastener 302, which is perpendicular to both the cutting direction 10 and the guide axis 28, and coaxial with the axis of rotation 33 of the fence 32.

The inner elastic member 308 cooperates with fence angle adjustment fastener 322 to adjust the angular orientation of the fence 32 about the fence axis of rotation 33. In the illustrated embodiment, in which the inner elastic member 308 is a Belleville washer, the fastener shank 326 passes through a central opening of the inner elastic member 308 whereby the inner elastic member 308 surrounds the fence angle adjustment fastener shank 326. In this configuration, the inner elastic member 308 is disposed between the inner fastener 312 and the body portion inner end 59. In addition, the inner elastic member 308 is disposed between an inside surface 31 of the fence 32 and the body portion 56. In particular, the inner elastic member 308 is disposed between the fence second side portion 46 and a side surface of the body portion 56. By this configuration, the inner elastic member 308 is disposed on an opposed side of the body portion 56 relative to the outer elastic member 310, and exerts a force on the fence inside surface 21 in a direction parallel to the guide axis 28 and away from the blade 8. In other words, the inner elastic member 308 biases the fence 32 toward the adjustment fastener head 324, which is disposed outside the fence 32.

Figure 37:
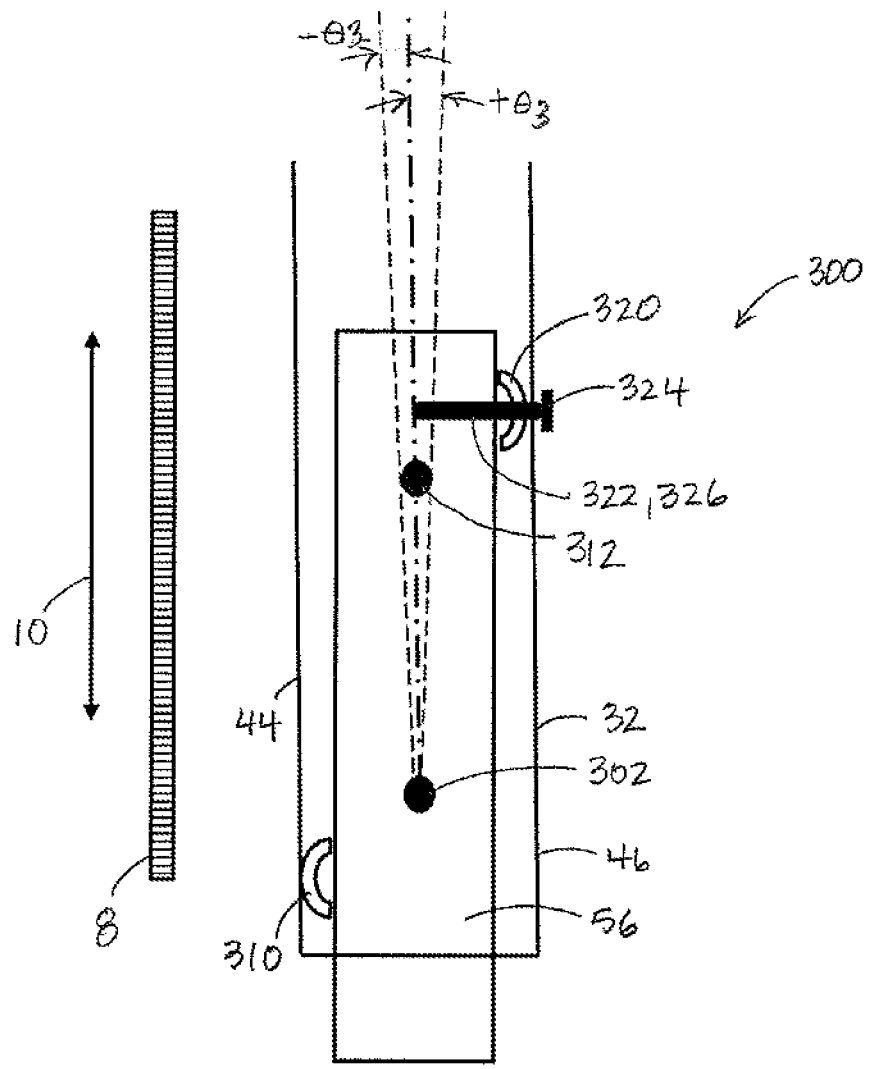
FIG. 37 is a schematic view of an end of the fence assembly illustrating the fence angle adjustment mechanism.

In use, the outer fastener 302 is located in the close piloting outer opening 43 and defines an axis of rotation 33 of the fence 32 that extends perpendicular to the cutting direction 10 and the guide axis 28. The fence axis of rotation 33 is located toward the front of the saw device 1 and provides a point of rotation for adjustment of the fence 32. In addition, the inner fastener 312, which is offset inwardly relative to the outer fastener 302, serves as a stop that limits an extent of angle change of the fence 32. For example, as seen in FIG. 37, the inner fastener 312 cooperates with the inner opening 49 to limit the angle change to plus or minus θ3. To this end, the inner opening 49 has a relatively loose clearance connection to allow for this range of adjustment angles. The fence angle adjustment fastener 322 is located closer to a second end of the fence 32 than the inner fastener 312, and the outer elastic member 310 biases the fence 32 toward the fastener head 324 and produces tension in the fence angle adjustment fastener 322.

The fence angle adjustment fastener 322 provides a controlled adjustment of the fence angular orientation since rotation of the fence angle adjustment fastener 322 with respect to the body portion 56 provides adjustment of an angular orientation of the fence 32 about the fence axis of rotation 33. Fineness or degree of the controlled adjustment is determined by the selection of the thread of the fastener shank 326. Tightening the fence angle adjustment fastener 322 moves the fence 32 toward the corresponding side of the body portion 56. Loosening the fence angle adjustment fastener 322 allows for the inner elastic member 320 to move the fence 32 away from the corresponding side of the body portion 56.

With the fence 32 in the desired position, the torque applied from tightening the outer and inner fasteners 302, 312 is countered by the positive connections at the point of rotation for adjustment of the fence 32 as well as by the fence angle adjustment fastener 322. This prevents a shift in the alignment when tightening the connection after adjustment. This is particularly true when the outer and inner fasteners 302, 312 are tightened in order of inner and then outer, as discussed further below.

Figure 38:
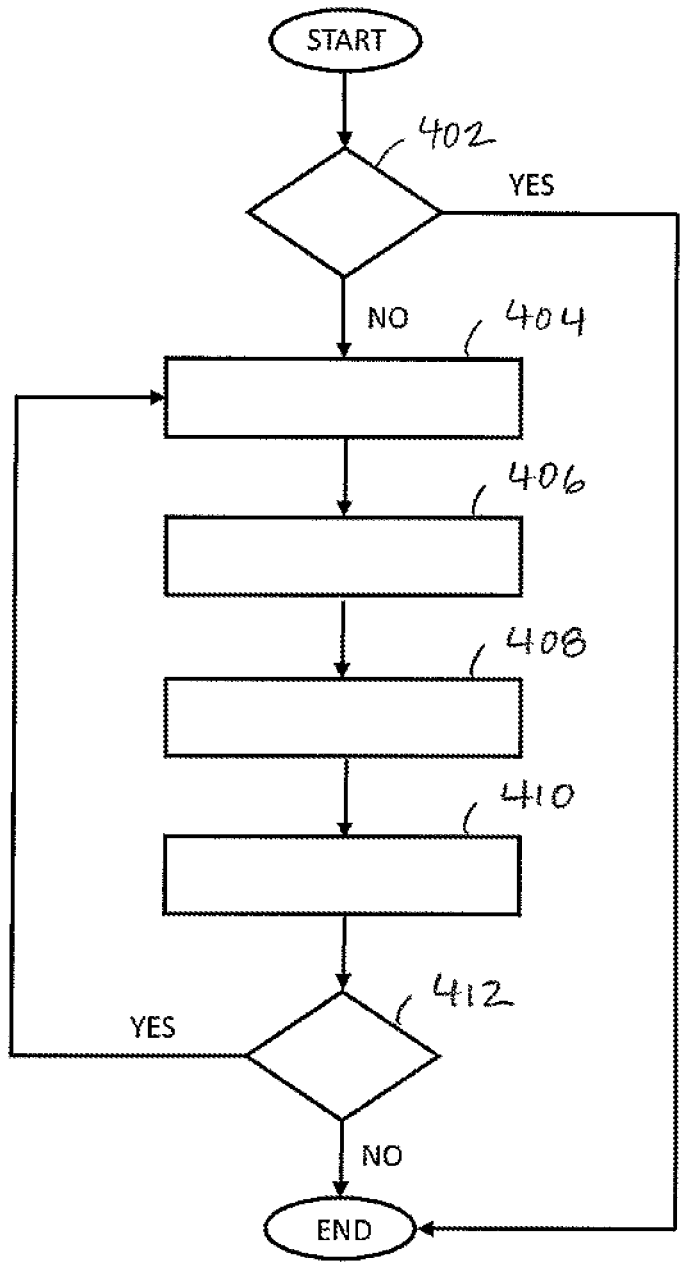
FIG. 38 is a flow diagram illustrating a method of adjusting the position of a guide fence of a saw device with respect to parallelism to a cutting blade of the saw device using a fence angle adjustment mechanism.

Referring to FIG. 38, a method of adjusting the position of a guide fence of a saw device with respect to parallelism to a cutting blade of the saw device using a fence angle adjustment mechanism will now be described.

As an initial step, a user of the saw device 1 may determine whether the fence 32 is parallel to the blade 8 by, for example measuring an alignment of the fence 32 with respect to the cutting direction 10 (step 402).

If it is determined that the fence is parallel to the cutting direction 10, no adjustment is necessary and no further steps are taken. If it is determined that the fence 32 is not parallel to the cutting direction 10, the user proceeds with adjusting the position of the fence 32 per the following method steps.

In order to adjust the position of the fence 32, the user must loosen the connection between the fence 32 and the body portion 56 of the front housing 54. This is achieved by rotating both the inner fastener 312 and the outer fastener 302 so as to loosen both the inner fastener 312 and the outer fastener 302 (step 404).

After the inner and outer fasteners 312, 302 have been loosened, the fence angle adjustment fastener 322 is rotated in order to rotate the fence 32 about the fence rotational axis 33 (step 406), thus moving the fence second end 36 relative to the fence first end 34. In this step, rotation of the fence angle adjustment fastener 322 in a first direction (for example a clockwise rotation) moves the fence 32 towards the body portion 56, and rotation of the fence angle adjustment fastener 322 in a second direction (for example a counter clockwise rotation) moves the fence 32 away from the body portion 56, where the second direction is opposed to the first direction. The fence angle adjustment fastener 322 is rotated until the fence 32 (e.g., until the fence longitudinal axis 37, and thus also the fence first side portion 44) is parallel to the cutting direction 10.

Following rotating the fence angle adjustment fastener 322, the outer fastener 302 is rotated so as to tighten the outer fastener 302 (step 408).

Following rotating the outer fastener 302 so as to tighten the outer fastener 302, rotating the inner fastener so as to tighten the inner fastener (step 410). Upon completion of this step, the fence 32 is secured to the front housing 54.

Performing steps 408 and 410, e.g., tightening the inner and outer fasteners 312, 302, does not change the position and/or orientation of the fence 32.

As a final step, the user of the saw device 1 may check the alignment of the fence 32 with respect to parallelism with the blade 8 as represented by the cutting direction 10 so as to verify that the fence 32 is aligned with the blade (step 412). If it is determined that the fence is parallel to the cutting direction 10, no further adjustment is necessary and no further steps are taken. If it is determined that the fence 32 is not parallel to the cutting direction 10, the user may return to step 404.

The method described in steps 402-412 provides advantages when compared to some conventional methods of adjusting the position of the fence with respect to parallelism with the blade 8. For example, in some conventional methods, screws connecting the fence to a housing are loosened, the position of the fence relative to the housing is adjusted into alignment and the connecting screws are retightened. In some cases, however, the effect of these adjustments is that initial reference of alignment is lost when screws connecting the fence to the housing are loosened. This makes it difficult to measure how much adjustment is required. Furthermore the fence and the housing may shift relative to each other while the connecting screws are retightened. This results from difficulty holding both pieces in relative position while trying to also tighten screws. Additionally the torque transferred from the connection screws can create movement between the fence and the housing. Each adjustment restarts the procedure by loosening the connection.

In contrast, in the method described in steps 402-412, the torque applied from tightening the outer and inner fasteners 302, 312 is countered by the positive connections at the point of rotation for adjustment of the fence 32 as well as by the fence angle adjustment fastener 322. This prevents a shift in the alignment when tightening the connection after adjustment. This is particularly true when the outer and inner fasteners 302, 312 are tightened in order of inner and then outer. Adjustment can be made to the angle of the fence longitudinal axis 37 without losing reference to a prior position, and micro adjustments can be made without risk of over-correction.

In the illustrated embodiment, the outer elastic member 310 and the inner elastic member 320 are, for example, Belleville washers. It is understood, however, that the outer elastic member 310 and the inner elastic member 320 may have alternative implementations. For example, in some embodiments, the outer elastic member 310 and the inner elastic member 320 may be a different type of spring, such as a coil spring, a wave spring, a leaf spring or other appropriate spring. In other embodiments, the outer elastic member 310 and the inner elastic member 320 may be a block of closed cell foam rubber or other appropriate material.

In the illustrated embodiment, the outer fastener 302 and the inner fastener 312 form threaded connections to the body portion 56 of the front housing 54. It is contemplated, however, that in some embodiments, the outer fastener 302 and the inner fastener 312 may thread into nuts that effectively connect the body portion 56 to the fence 32. In still other embodiments, one or both of the outer fastener 302 and the inner fastener 312 may be pins rather than screws. For example, the shank portions 306, 326 of the fasteners 302, 312 may be free of threads. In some embodiments, the heads 304, 324 may also be omitted.

Although the tension member 120 is described herein as being a rectangular rod, the tension member 120 is not limited to this configuration. In one example, in some embodiments, the tension member 120 may be a cylindrical rod. In another example, in some embodiments the tension member 120 may be a cable. A cable has the benefit of providing flexibility that can accommodate for friction induced bending and can maintain beneficial degrees of freedom in rotating members.

Although the table top 2 of the saw device 1 shown in the illustrated embodiments includes a pair of rails 20, 22, the saw device 1 is not limited to this configuration. For example, in some embodiments, a saw device having only one rail is contemplated. In these situations, locking may be achieved by clamping from the back side of the one rail.

Although the saw device 1 illustrated in the figures is, for example, a table saw, the saw device is not limited to being a table saw. In other embodiments, the saw device may be, for example, a band saw, a chop saw or other type of cutting tool in which a fence assembly is used to position a workpiece on a surface relative to the blade or other cutting element.

Selective illustrative embodiments of the portable table saw and fence assembly including a fence tension adjustment mechanism are described above in some detail. It should be understood that only structures considered necessary for clarifying certain features of the table saw and fence assembly have been described herein. Other conventional structures, and ancillary and auxiliary components of the portable table saw and the fence assembly are assumed to be known and understood by those skilled in the art. Moreover, while a working example of the portable table saw and fence assembly has been described above, the portable table saw and fence assembly are not limited to the working example described above, but various design alterations may be carried out without departing from the portable table saw, fence assembly and/or fence tension adjustment mechanism as set forth in the claims.

We claim:

1. A fence assembly that is configured to guide a workpiece in parallel to a blade of a saw device, the fence assembly being supported by a rail relative to a work surface of the saw device, the fence assembly comprising:
   a fence including
      a fence first end, and
      a fence second end that is opposed to the fence first end;
   a rail engagement member coupled to the fence first end and supported on the rail, the rail engagement member including a first housing, the first housing having
      a body portion that is disposed inside the fence, and
      a flange portion that extends from an outer end of the body portion, is disposed outside the fence and is configured to engage the rail; and
   a fence angle adjustment mechanism associated with the rail engagement member, the fence angle adjustment mechanism configured to adjust the alignment of the fence to extend in parallel to the blade when the fence assembly is supported by the rail, the fence angle adjustment mechanism including
      an outer fastener that connects the fence to the body portion, the outer fastener providing an axis of rotation of the fence during adjustment of the alignment of the fence,
      an inner fastener that connects the fence to the body portion, the inner fastener being parallel to and spaced apart from the outer fastener,
      an adjustment fastener that is connected to the body portion, the adjustment fastener being perpendicular to and spaced apart from the inner fastener and the outer fastener, wherein rotation of the adjustment fastener with respect to the body portion provides adjustment of an angular orientation of the fence about the axis of rotation, and
      an inner elastic member disposed between the fence and the body portion, the inner elastic member configured to bias the fence toward a head of the adjustment fastener.

2. The fence assembly of claim 1, wherein the fence angle adjustment mechanism comprises an outer elastic member disposed between an inside surface of the fence and the outer end of the body portion.

3. The fence assembly of claim 2, wherein the inner elastic member is disposed between an inside surface of the fence and an inner end of the body portion, and the inner elastic member is disposed on an opposed side of the body portion relative to the outer elastic member.

4. The fence assembly of claim 1, wherein the outer fastener is disposed between a mid point of the body portion and the outer end of the body portion; the inner fastener serves as a stop, and is disposed between the mid point of the body portion and an inner end of the body portion; and the adjustment fastener is disposed between the inner fastener and the inner end of the body portion.

5. The fence assembly of claim 1, wherein the adjustment fastener includes the head disposed outside the fence and a shank, the shank protruding from the head, extending through the fence and engaging with the body portion, and the inner elastic member is disposed between the body portion and the fence, and surrounds the shank of the adjustment fastener.

6. The fence assembly of claim 1, wherein the outer fastener extends through an outer opening in the fence and engages the body portion, and the outer opening receives the outer fastener in a pilot fit.

7. The fence assembly of claim 6, wherein the fence angle adjustment mechanism comprises an outer elastic member disposed between an inside surface of the fence and the outer end of the body portion, and the outer elastic member biases the fence against the outer fastener.

8. The fence assembly of claim 1, wherein the inner fastener extends through an inner opening in the fence and engages the body portion, and the inner opening receives the inner fastener in a clearance fit.

9. The fence assembly of claim 1 wherein the fence includes a work surface-facing edge that faces the work surface of the saw device, and an opposed edge that is opposed to the work surface-facing edge, and the outer fastener and the inner fastener extend through respective outer and inner openings in the opposed edge.

10. The fence assembly of claim 9, wherein the respective outer and inner openings in the fence opposed edge are aligned along a longitudinal axis of the fence, where the longitudinal axis of the fence extends between the fence first end and the fence second end.

11. The fence assembly of claim 1, wherein the fence angle adjustment mechanism comprises an outer elastic member disposed between an inside surface of the fence and the outer end of the body portion, and the outer elastic member biases the fence against the outer fastener.

12. The fence assembly of claim 1, comprising:
a cutting axis; and
a guide axis that is transverse to the cutting axis and parallel to the rail, wherein
a longitudinal axis of the outer fastener is perpendicular to both the cutting axis and the guide axis, and the axis of rotation of the fence is coaxial with the longitudinal axis of the outer fastener.

13. The fence assembly of claim 12, wherein a longitudinal axis of the adjustment fastener extends in parallel to the guide axis.

14. The fence assembly of claim 1, wherein
the fence includes a first side that is perpendicular to the work surface and faces the blade, and a second side that is opposed to the first side,
at least one of the first side and the second side include a recess, and
the head of the adjustment fastener is disposed in the recess.

15. The fence assembly of claim 1 wherein
the fence includes a work surface-facing edge that faces the work surface of the saw device, and an opposed edge that is opposed to the work surface-facing edge,
the opposed edge includes a recess, and
heads of the inner fastener and the outer fastener are disposed in the recess.

16. A method of adjusting the alignment of a guide fence of a saw device to extend parallel to a cutting blade of the saw device using a fence angle adjustment mechanism,
the fence supported by a rail for sliding movement relative to a work surface of the saw device, and an end of the fence supported on the rail via a rail engagement member, the fence angle adjustment mechanism associated with a housing of the rail engagement member,
the fence angle adjustment mechanism including
an outer fastener that connects the fence to the housing,
an inner fastener that connects the fence to the body housing, the inner fastener being parallel to and spaced apart from the outer fastener,
an adjustment fastener that connects the fence to the housing, the adjustment fastener being perpendicular to and spaced apart from the inner fastener and the outer fastener, wherein rotation of the adjustment fastener with respect to the housing provides adjustment of an angular orientation of the fence about an axis of rotation, and
an inner elastic member disposed between the fence and the housing, the inner elastic member configured to bias the fence toward a head of the adjustment fastener,
the method comprising the following method steps:
rotating both the inner fastener and the outer fastener so as to loosen both the inner fastener and the outer fastener;
rotating the adjustment fastener, wherein rotation of the adjustment fastener in a first direction moves the fence towards the housing and rotation of the adjustment fastener in a second direction moves the fence away from the housing, where the second direction is opposed to the first direction and wherein during the step of rotating the adjustment fastener the fence is moved into alignment with the cutting blade;
following rotating the adjustment fastener, rotating the outer fastener so as to tighten the outer fastener;
following rotating the outer fastener so as to tighten the outer fastener, rotating the inner fastener so as to tighten the inner fastener.

17. The method of claim 16, comprising the following method step performed at least prior to the step of rotating both the inner fastener and the outer fastener so as to loosen both the inner fastener and the outer fastener:
checking the alignment of the fence relative to the blade to determine if adjustment is necessary.

18. The method of claim 16, comprising the following method step performed following the step of rotating the inner fastener so as to tighten the inner fastener:
verifying that the fence is aligned with the blade.

19. A fence assembly that is configured to guide a workpiece in parallel to a blade of a saw device, the fence assembly being supported by one or more rails relative to a work surface of the saw device, the fence assembly comprising:
a fence including
a fence first end, and
a fence second end that is opposed to the fence first end;
a first rail engagement member coupled to the fence first end and supported on a first one of the rails, the first rail engagement member including a first housing, the first housing having
a body portion that is disposed inside the fence, and
a flange portion that extends from an outer end of the body portion, is disposed outside the fence and is configured to engage the first one of the rails;
a second rail engagement member coupled to the fence second end and supported on a second one of the rails, the second rail engagement member including a second housing and a rail engagement device that is configured to engage the second one of the rails; and
a fence angle adjustment mechanism associated with the first rail engagement member, the fence angle adjustment mechanism configured to adjust the alignment of the fence to extend parallel to the blade when the fence assembly is supported by the rail, the fence angle adjustment mechanism including
an outer fastener that connects the fence to the body portion, the outer fastener providing an axis of rotation of the fence during alignment of the fence,
an inner fastener that connects the fence to the body portion, the inner fastener being parallel to and spaced apart from the outer fastener,
an adjustment fastener that is connected to the body portion, the adjustment fastener being perpendicular to and spaced apart from the inner fastener and the outer fastener, wherein rotation of the adjustment fastener with respect to the body portion provides adjustment of an angular orientation of the fence about the axis of rotation, and
an inner elastic member disposed between the fence and the body portion, the inner elastic member configured to bias the fence toward a head of the adjustment fastener.

* * * * *